(12) United States Patent
Taylor et al.

(10) Patent No.: US 12,170,802 B2
(45) Date of Patent: Dec. 17, 2024

(54) PRIORITY MEDIA CONTENT

(71) Applicant: Sonos, Inc., Santa Barbara, CA (US)

(72) Inventors: Ryan Taylor, Santa Barbara, CA (US); Joseph Dawson, New York, NY (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/353,762

(22) Filed: Jul. 17, 2023

(65) Prior Publication Data

US 2024/0022777 A1 Jan. 18, 2024

Related U.S. Application Data

(63) Continuation of application No. 17/972,358, filed on Oct. 24, 2022, now Pat. No. 11,706,473, which is a
(Continued)

(51) Int. Cl.
*H04N 21/262* (2011.01)
*H04N 21/214* (2011.01)
*H04N 21/239* (2011.01)

(52) U.S. Cl.
CPC ... *H04N 21/26258* (2013.01); *H04N 21/2143* (2013.01); *H04N 21/2393* (2013.01)

(58) Field of Classification Search
CPC ......... H04N 21/26258; H04N 21/2143; H04N 21/2393; H04N 21/4383; H04N 21/4532; H04N 21/4825
See application file for complete search history.

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |

(Continued)

OTHER PUBLICATIONS

AudioTron Quick Start Guide, Version 1.0, Mar. 2001, 24 pages.
(Continued)

*Primary Examiner* — Farzana Hossain

(57) ABSTRACT

A cloud-based computing system is configured to (i) maintain a scheduled playlist of media items, a current playback position within the scheduled playlist, and a priority media item for playback, (ii) receive, from a first playback device associated with an account, a first request to play back the scheduled playlist, (iii) transmit the priority media item to the first playback device for playback before any media item from the scheduled playlist, (iv) receive, from a second playback device associated with the account, a second request to play back the scheduled playlist, (v) determine that the priority media item should not be transmitted to the second playback device, and (vi) after determining that the priority media item should not be transmitted to the second playback device, transmit one or more media items from the scheduled playlist to the second playback device based on the current playback position within the scheduled playlist.

18 Claims, 17 Drawing Sheets

Related U.S. Application Data continuation of application No. 17/235,691, filed on Apr. 20, 2021, now Pat. No. 11,483,608.

(60) Provisional application No. 63/013,326, filed on Apr. 21, 2020.

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,647,269 B2 | 11/2003 | Hendrey et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,392,583 B2 | 3/2013 | Bijwaard et al. |
| 8,483,853 B1 | 7/2013 | Lambourne |
| 8,516,075 B2 | 8/2013 | Seetharam et al. |
| 8,701,204 B2 | 4/2014 | Carr et al. |
| 8,942,252 B2 | 1/2015 | Balassanian et al. |
| 8,954,346 B1 | 2/2015 | Walker et al. |
| 8,959,085 B2 | 2/2015 | Fisher et al. |
| 9,318,152 B2 | 4/2016 | Kretz et al. |
| 9,326,070 B2 | 4/2016 | Bender et al. |
| 9,374,682 B2 | 6/2016 | Weng et al. |
| 9,426,519 B1 | 8/2016 | Lewis et al. |
| 9,442,626 B2 | 9/2016 | Schupak et al. |
| 9,467,322 B2 | 10/2016 | Dietrich et al. |
| 9,491,499 B2 | 11/2016 | Wagenaar et al. |
| 9,549,010 B2 | 1/2017 | Samuell et al. |
| 9,729,599 B2 | 8/2017 | Beckhardt et al. |
| 9,882,945 B2 | 1/2018 | Frankel et al. |
| 9,930,470 B2 | 3/2018 | Reilly et al. |
| 10,057,662 B2 | 8/2018 | Talukder |
| 10,063,600 B1 | 8/2018 | Marsh et al. |
| 10,095,469 B2 | 10/2018 | Reimann et al. |
| 10,102,855 B1 | 10/2018 | Sindhwani |
| 10,134,059 B2 | 11/2018 | Mishra et al. |
| 10,142,685 B2 | 11/2018 | Arsenault et al. |
| 10,154,122 B1 | 12/2018 | Coburn, IV et al. |
| 10,158,908 B1 | 12/2018 | Ramani et al. |
| 10,268,357 B2 | 4/2019 | Vega et al. |
| 10,298,640 B1 | 5/2019 | Luke et al. |
| 10,389,782 B2 | 8/2019 | Alsina et al. |
| 10,409,546 B2 | 9/2019 | Zalon et al. |
| 10,423,382 B2 | 9/2019 | De Angelis et al. |
| 10,433,057 B2 | 10/2019 | Banerjee et al. |
| 10,447,803 B2 | 10/2019 | Wilde |
| 10,509,558 B2 | 12/2019 | Chen et al. |
| 10,652,715 B1 | 5/2020 | Adell et al. |
| 10,877,637 B1 | 12/2020 | Antos et al. |
| 11,049,176 B1 | 6/2021 | Drynan |
| 11,100,922 B1 | 8/2021 | Mutagi et al. |
| 11,178,716 B2 | 11/2021 | Baik et al. |
| 11,706,473 B2 * | 7/2023 | Taylor ............... H04N 21/2143 725/82 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0102993 A1 | 8/2002 | Hendrey et al. |
| 2002/0124097 A1 | 9/2002 | Isely et al. |
| 2003/0152226 A1 | 8/2003 | Candelore et al. |
| 2003/0157951 A1 | 8/2003 | Hasty, Jr. |
| 2004/0024478 A1 | 2/2004 | Hans et al. |
| 2006/0020968 A1 | 1/2006 | Kroll et al. |
| 2007/0073584 A1 | 3/2007 | Grouf et al. |
| 2007/0120975 A1 | 5/2007 | Tsai et al. |
| 2007/0142944 A1 | 6/2007 | Goldberg et al. |
| 2008/0040283 A1 | 2/2008 | Morris |
| 2008/0139181 A1 | 6/2008 | Lokshin |
| 2009/0012847 A1 | 1/2009 | Brooks et al. |
| 2009/0012848 A1 | 1/2009 | Brooks et al. |
| 2009/0019374 A1 | 1/2009 | Logan et al. |
| 2009/0164902 A1 | 6/2009 | Cohen et al. |
| 2009/0328087 A1 | 12/2009 | Higgins et al. |
| 2010/0146091 A1 | 6/2010 | Curtis et al. |
| 2011/0307919 A1 | 12/2011 | Weerasinghe |
| 2012/0245995 A1 | 9/2012 | Chawla |
| 2012/0254347 A1 | 10/2012 | Seetharam et al. |
| 2013/0111347 A1 | 5/2013 | Reilly et al. |
| 2013/0218942 A1 | 8/2013 | Willis et al. |
| 2014/0093114 A1 | 4/2014 | Nguyen et al. |
| 2014/0245346 A1 | 8/2014 | Cheng et al. |
| 2015/0278322 A1 | 10/2015 | Beckhardt |
| 2015/0324552 A1 | 11/2015 | Beckhardt |
| 2015/0326927 A1 | 11/2015 | Billmeyers |
| 2015/0355879 A1 | 12/2015 | Beckhardt et al. |
| 2016/0103652 A1 | 4/2016 | Kuniansky |
| 2016/0260145 A1 | 9/2016 | High et al. |
| 2016/0261904 A1 | 9/2016 | Qian et al. |
| 2016/0323482 A1 | 11/2016 | Chung |
| 2016/0352797 A1 | 12/2016 | Marusich et al. |
| 2017/0164357 A1 | 6/2017 | Fan et al. |
| 2017/0242653 A1 | 8/2017 | Lang et al. |
| 2017/0289202 A1 | 10/2017 | Krasadakis |
| 2017/0330429 A1 | 11/2017 | Tak et al. |
| 2018/0197158 A1 | 7/2018 | Smalley et al. |
| 2018/0316958 A1 | 11/2018 | Anschutz |
| 2018/0322861 A1 | 11/2018 | Ibrahim |
| 2018/0352017 A1 | 12/2018 | Schneider et al. |
| 2019/0138573 A1 | 5/2019 | Land et al. |
| 2019/0155840 A1 | 5/2019 | O'Konski et al. |
| 2019/0258335 A1 | 8/2019 | Beaumier et al. |
| 2019/0279260 A1 | 9/2019 | Carpita et al. |
| 2019/0289422 A1 | 9/2019 | Kao |
| 2020/0007926 A1 | 1/2020 | Tang et al. |
| 2020/0275250 A1 | 8/2020 | Choi et al. |
| 2020/0412822 A1 | 12/2020 | Allen |
| 2020/0413117 A1 | 12/2020 | Loheide et al. |
| 2021/0152858 A1 | 5/2021 | Berger |
| 2021/0233110 A1 | 7/2021 | Ye et al. |
| 2022/0374970 A1 | 11/2022 | Bronicki |

FOREIGN PATENT DOCUMENTS

| | | |
|---|---|---|
| WO | 2003093950 A2 | 11/2003 |
| WO | 2019137897 A1 | 7/2019 |

OTHER PUBLICATIONS

AudioTron Reference Manual, Version 3.0, May 2002, 70 pages.
AudioTron Setup Guide, Version 3.0, May 2002, 38 pages.
Australian Patent Office, Australian Examination Report Action mailed on Nov. 18, 2022, issued in connection with Australian Application No. 2021259316, 2 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.

(56) References Cited

OTHER PUBLICATIONS

Chen et al., "What a Juke! A Collaborative Music Sharing System," World of Wireless, Mobile and Multimedia Networks (WOWMOM), 2012 IEEE International Symposium, 2012, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Oct. 12, 2023, issued in connection with European Application No. 20817169.4, 15 pages.
International Bureau, International Preliminary Report on Patentability and Written Opinion, mailed on Nov. 3, 2022, issued in connection with International Application No. PCT/US2021/028205, filed on Oct. 25, 2022, 10 pages.
International Bureau, International Search Report and Written Opinion mailed on Jul. 14, 2021, issued in connection with International Application No. PCT/US2021/028205, filed on Apr. 20, 2021, 10 pages.
International Bureau, International Search Report and Written Opinion mailed on Feb. 5, 2021, issued in connection with International Application No. PCT/US2020/059994, filed on Nov. 11, 2020, 20 pages.
IP.com. "A method for personalised notification of a broadcast media item •• "You must hear this"," An IP.com Prior Art Database Technical Disclosure, IP.com No. IPCOM000028474D, May 17, 2004, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Feb. 10, 2023, issued in connection with U.S. Appl. No. 17/703,173, filed Mar. 24, 2022, 13 pages.
Non-Final Office Action mailed on Nov. 10, 2022, issued in connection with U.S. Appl. No. 17/556,968, filed Dec. 20, 2021, 24 pages.
Non-Final Office Action mailed on May 12, 2021, issued in connection with U.S. Appl. No. 16/680,234, filed Nov. 11, 2019, 15 pages.
Non-Final Office Action mailed on Jan. 19, 2022, issued in connection with U.S. Appl. No. 17/235,691, filed Apr. 20, 2021, 14 pages.
Non-Final Office Action mailed on Sep. 21, 2020, issued in connection with U.S. Appl. No. 16/680,234, filed Nov. 11, 2019, 13 pages.
Non-Final Office Action mailed on Jan. 27, 2022, issued in connection with U.S. Appl. No. 16/680,232, filed Nov. 11, 2019, 14 pages.
Notice of Allowance mailed Sep. 7, 2021, issued in connection with U.S. Appl. No. 17/235,704, filed Apr. 20, 2021, 13 pages.
Notice of Allowance mailed on Dec. 1, 2022, issued in connection with U.S. Appl. No. 17/235,704, filed Apr. 20, 2021, 14 pages.
Notice of Allowance mailed on Jun. 8, 2022, issued in connection with U.S. Appl. No. 17/235,691, filed Apr. 20, 2021, 6 pages.
Notice of Allowance mailed on Sep. 1, 2023, issued in connection with U.S. Appl. No. 17/235,704, filed Apr. 20, 2021, 14 pages.
Notice of Allowance mailed on Jun. 13, 2022, issued in connection with U.S. Appl. No. 16/680,232, filed Nov. 11, 2019, 9 pages.
Notice of Allowance mailed on Mar. 17, 2023, issued in connection with U.S. Appl. No. 17/556,968, filed Dec. 20, 2021, 11 pages.
Notice of Allowance mailed on Nov. 2, 2021, issued in connection with U.S. Appl. No. 17/235,704, filed Apr. 20, 2021, 13 pages.
Notice of Allowance mailed on Oct. 22, 2021, issued in connection with U.S. Appl. No. 16/680,234, filed Nov. 11, 2019, 11 pages.
Notice of Allowance mailed on Feb. 23, 2021, issued in connection with U.S. Appl. No. 16/680,234, filed Nov. 11, 2019, 11 pages.
Notice of Allowance mailed on Feb. 28, 2023, issued in connection with U.S. Appl. No. 17/972,358, filed Oct. 24, 2022, 10 pages.
Notice of Allowance mailed on Jun. 28, 2023, issued in connection with U.S. Appl. No. 17/703,173, filed Mar. 24, 2022, 8 pages.
"Overview of Packeting in MusicMaster," Web page https://musicmaster.com/?p=169, 4 pages, Dec. 1, 2010.
"Packets: Three Different Ways to Manage Challenges Within Your Library," https://musicmaster.com/?p=7473, 4 pages, May 6, 2019.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

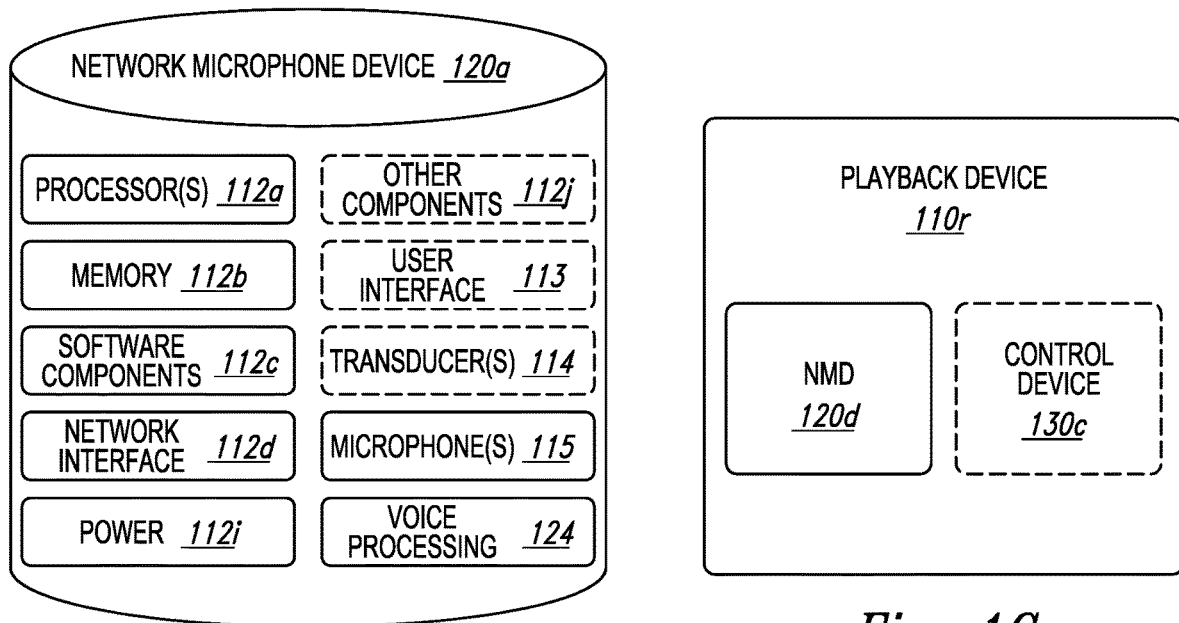
Fig. 1F
Fig. 1G
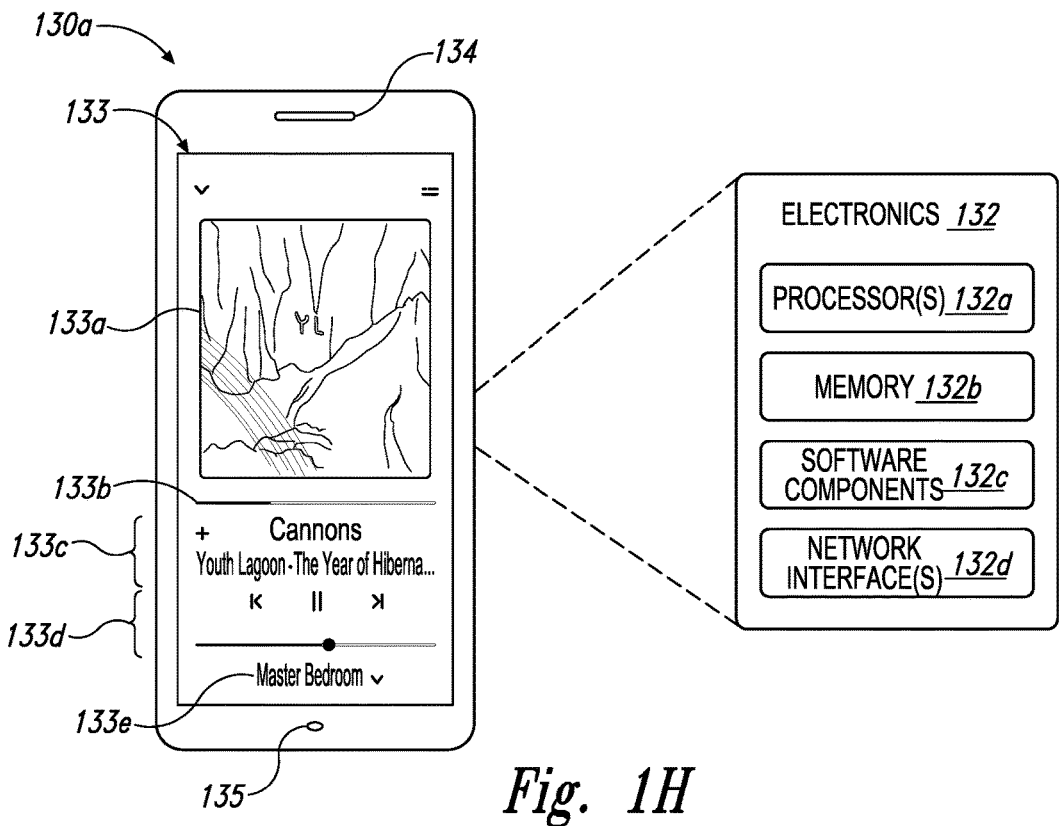
Fig. 1H

PRIORITY MEDIA CONTENT

CROSS-REFERENCE TO RELATED APPLICATIONS

This application claims the benefit of priority under 35 U.S.C. § 120 to U.S. application Ser. No. 17/9792,358 filed on Oct. 24, 2022, entitled "Priority Media Content," which claims the benefit of priority under 35 U.S.C. § 120 to U.S. application Ser. No. 17/235,691 filed Apr. 20, 2021, entitled "Priority Media Content," which claims the benefit of priority under 35 U.S.C. § 119 to U.S. Provisional Patent App. No. 63/013,326, filed Apr. 21, 2020, the content of each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
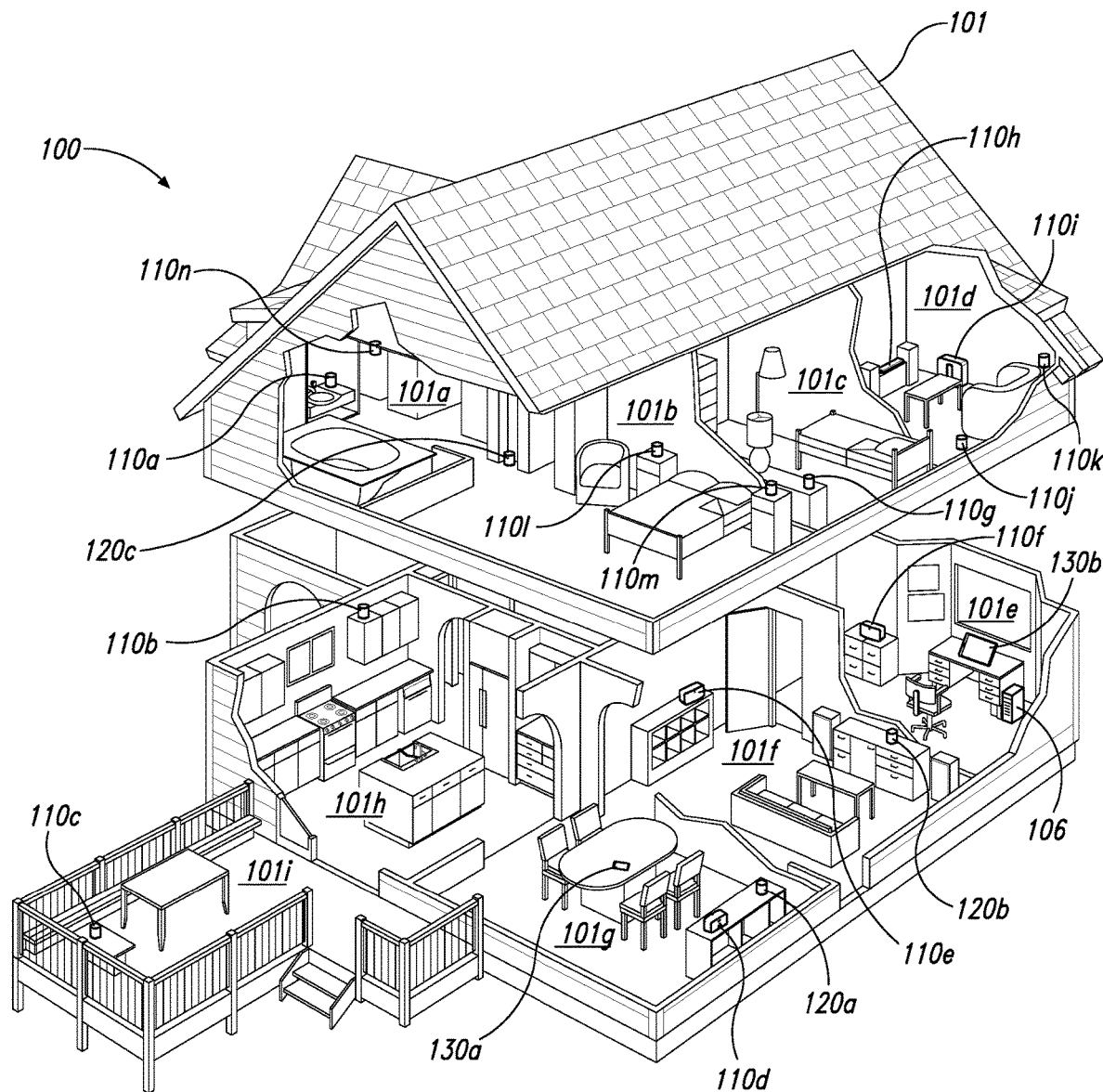
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to maintaining a scheduled playlist of media items, such as an internet radio program, including a priority media item that may be transmitted to a playback device the first time the playback device requests playback of the scheduled playlist within a predetermined time period.

Traditionally, both terrestrial radio broadcasts and internet radio stations have followed a fixed programming schedule that is received and played back by a given playback device, wherever that playback device may be located. Indeed, today even terrestrial radio broadcasts that are curated and timed for a particular geographical location can now be available for listeners to enjoy all over the world in different time zones and geographic locations. However, one challenge associated with such traditional, fixed programming is that it can be difficult to schedule featured radio content for a time that is relevant to and/or accessible by a wide range of users that may be located in different time zones. For example, although many listeners (e.g., in New York) may be at home and available to listen to featured radio content that is scheduled to begin at 7 pm ET, many other listeners (e.g., in London) may be asleep at this time, and still others (e.g., in California) may still be at work, which may limit the potential audience for the featured radio content.

Accordingly, discussed herein is a new approach for providing priority content in association with a scheduled playlist of media items, such as an internet radio station. When a listener requests to play back a given internet radio station for the first time within a predetermined time period, the priority content is played before transitioning to the regularly scheduled playlist of media items. For instance, the priority content might be one or more songs from a newly released album, and the predetermined time period might be a window of 24 hours, 2 days, or one week following the new album's release. Numerous other examples of priority content, and other windows for playback are also possible.

Once the priority content has been played, if the same listener requests to play back the given internet radio station again during the predetermined time period, the scheduled playlist will begin play back normally, foregoing playback of the priority content. In this way, all listeners are provided with a chance to experience the priority content, regardless of when they initiate playback of the internet radio station, while also avoiding the repeated playback of the same priority content each time the listener initiates playback.

Accordingly, in one aspect, the disclosed technology may take the form of a method that involves (i) maintaining (a) a scheduled playlist of media items for playback by one or more playback devices, (b) a current playback position within the scheduled playlist of media items, and (c) a priority media item for playback by the one or more playback devices, the priority media item comprising a playback length; (ii) receiving, from a playback device over a communication network, a request to play back the scheduled playlist of media items; (iii) based on the received request, transmit the priority media item to the playback device for playback beginning at a first time; (iv) determining a next media item from the scheduled playlist of media items based on the current playback position within the scheduled playlist at a second time that follows the first time by at least the playback length of the priority media item; and (v) beginning with the next media item, transmit one or more media items from the scheduled playlist of media items to the playback device for playback after the priority media item.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-8.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
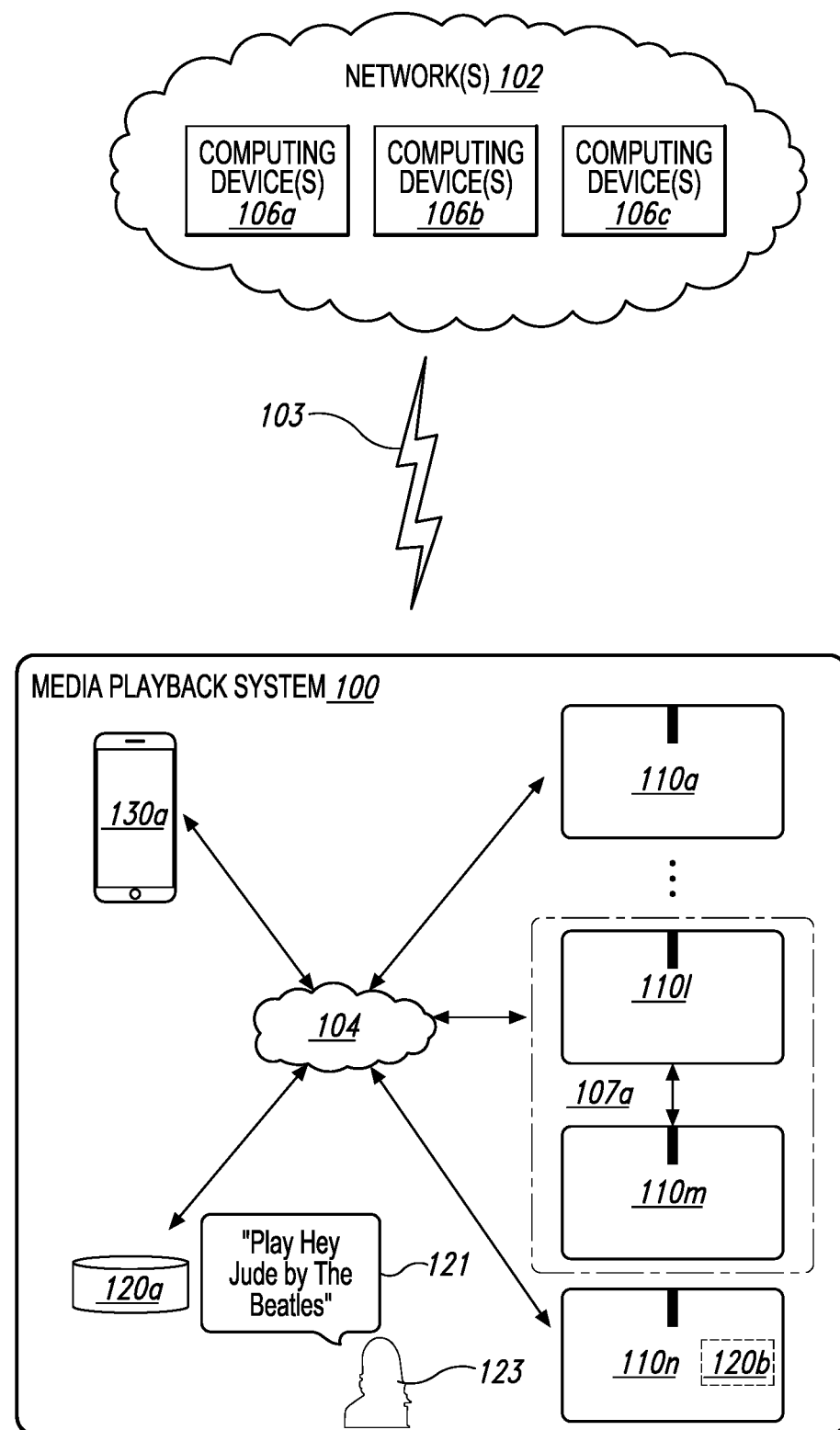
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
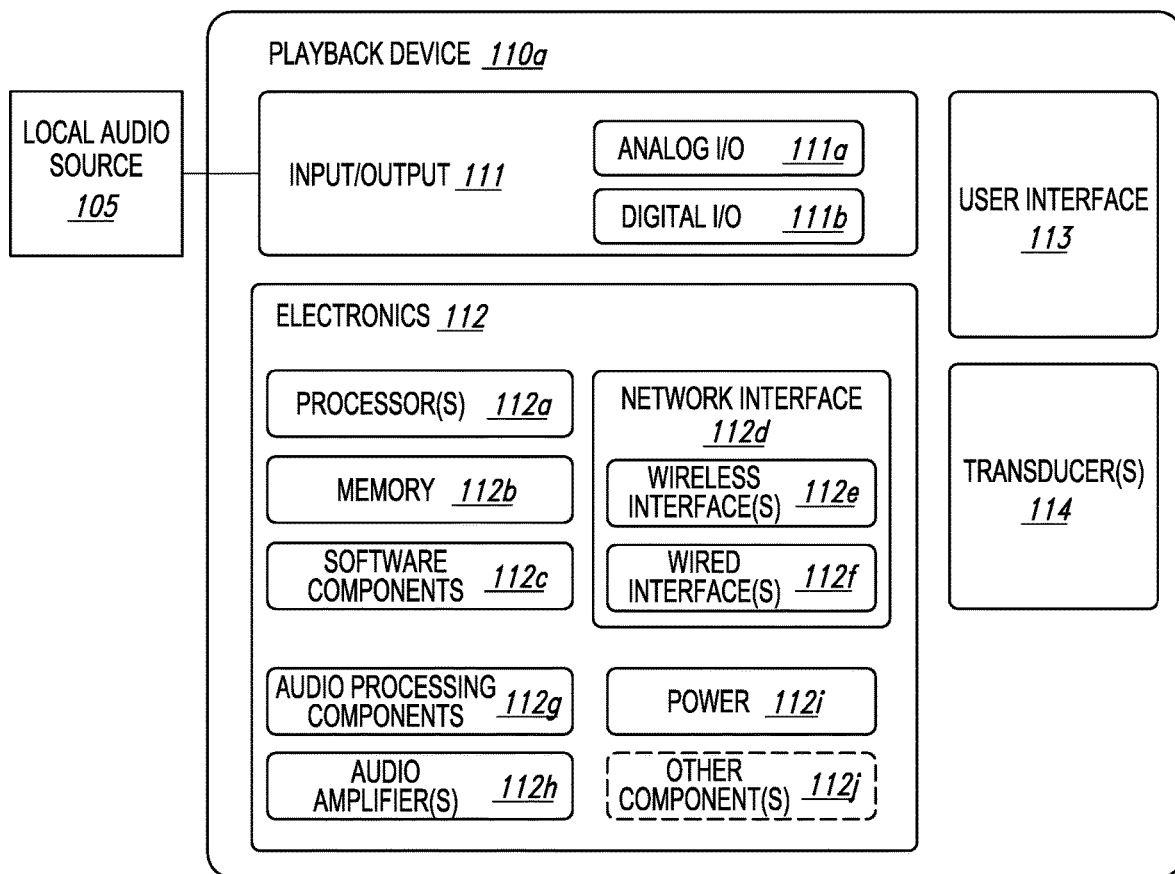
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
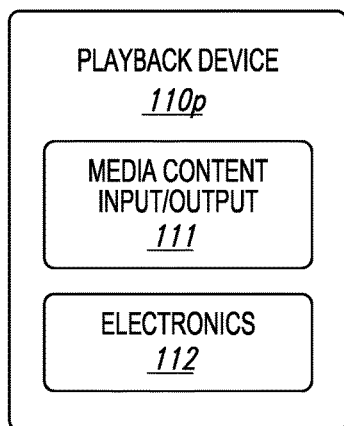
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
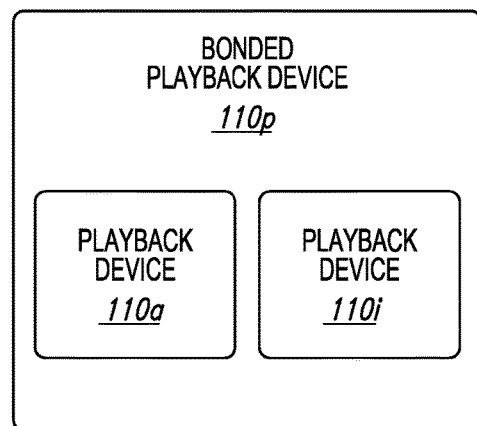
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
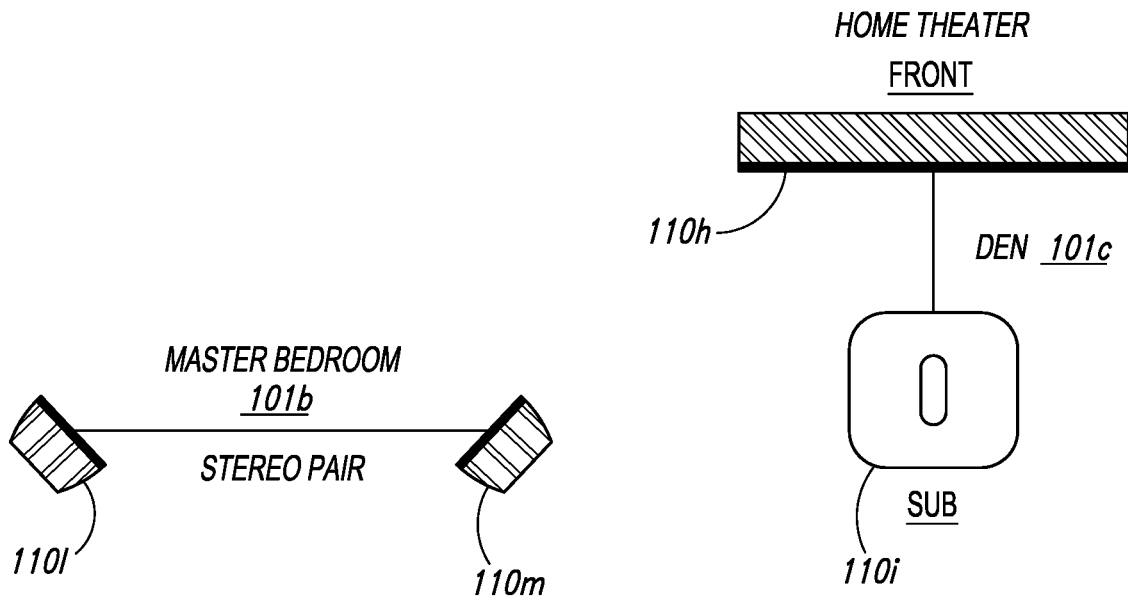
FIG. 1F is a block diagram of a network microphone device.
FIG. 1G is a block diagram of a playback device.
FIG. 1H is a partially schematic diagram of a control device.
FIGS. 1-I through 1L are schematic diagrams of corresponding media playback system zones.
FIG. 1M is a schematic diagram of media playback system areas.
Figures 1K, 1L:
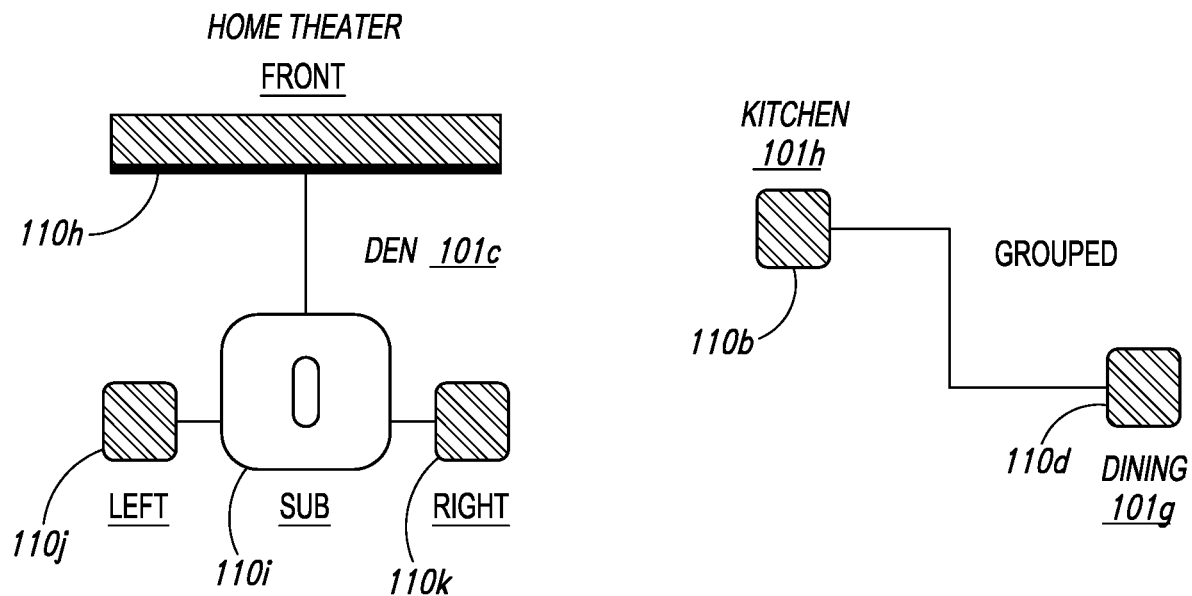
Figure 1M:
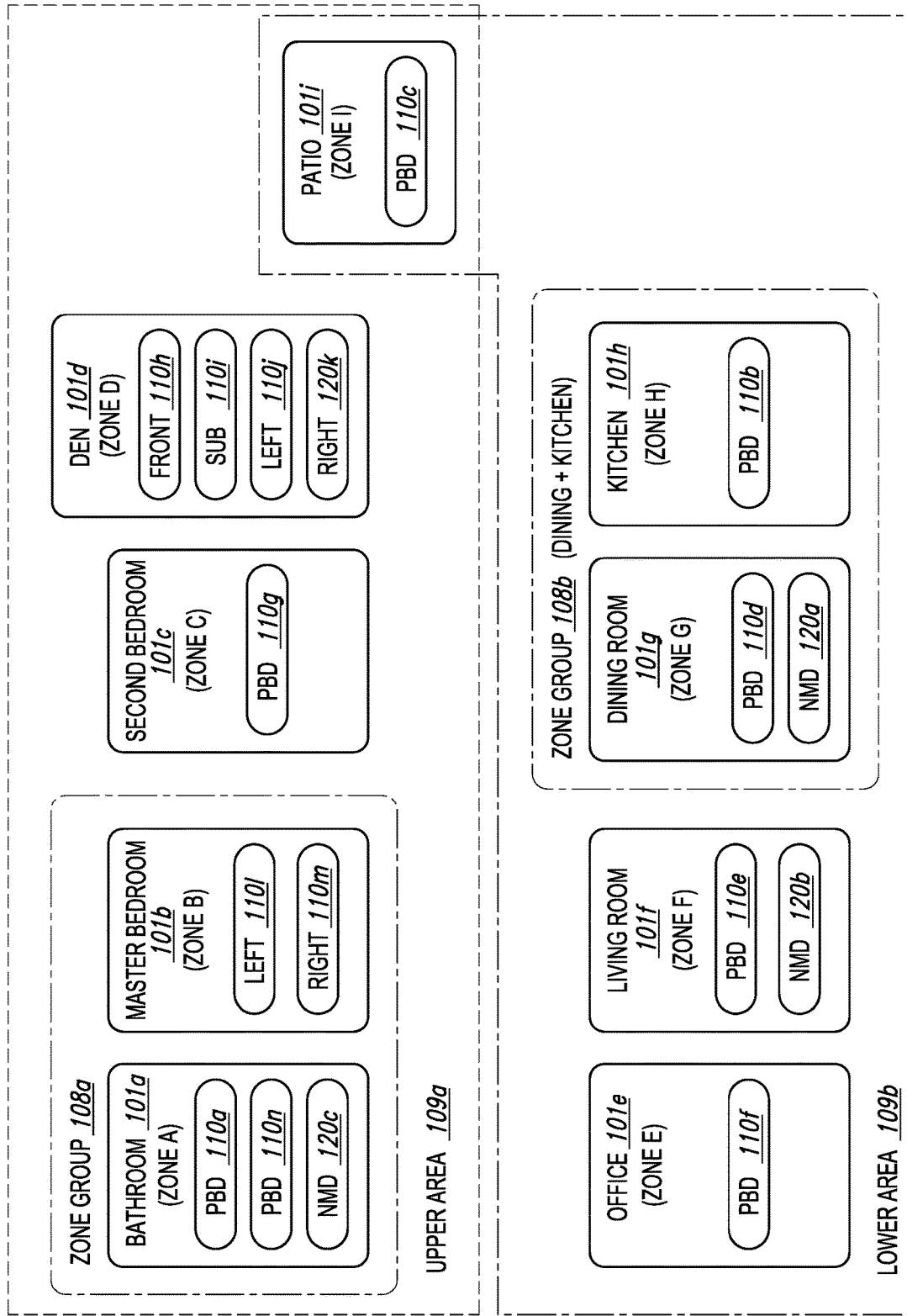

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b 1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
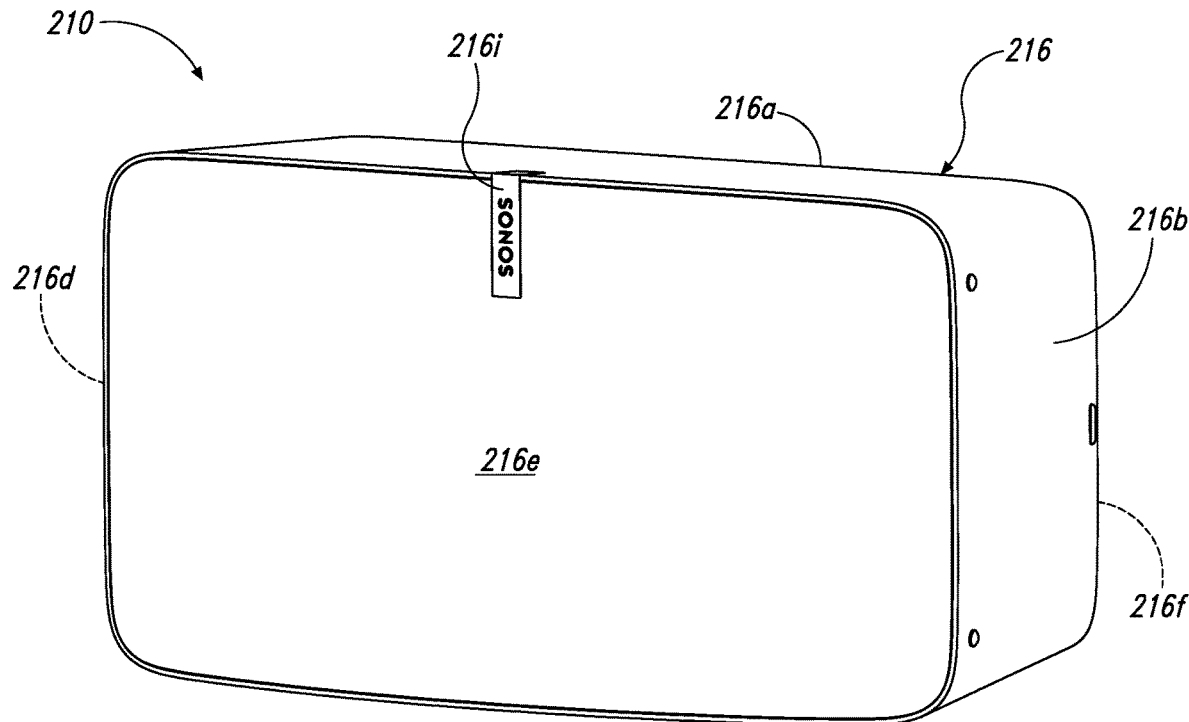
FIG. 2A is a front isometric view of a playback device configured in accordance with aspects of the disclosed technology.
Figure 2B:
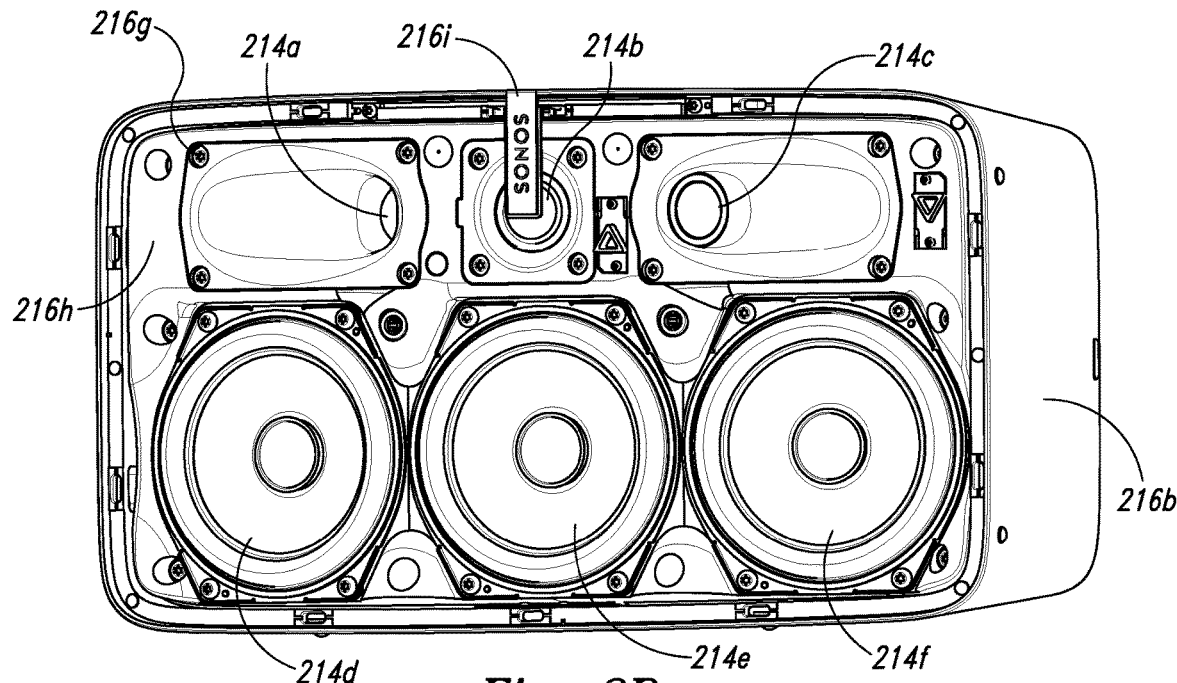
FIG. 2B is a front isometric view of the playback device of FIG. 3A without a grille.
Figure 2C:
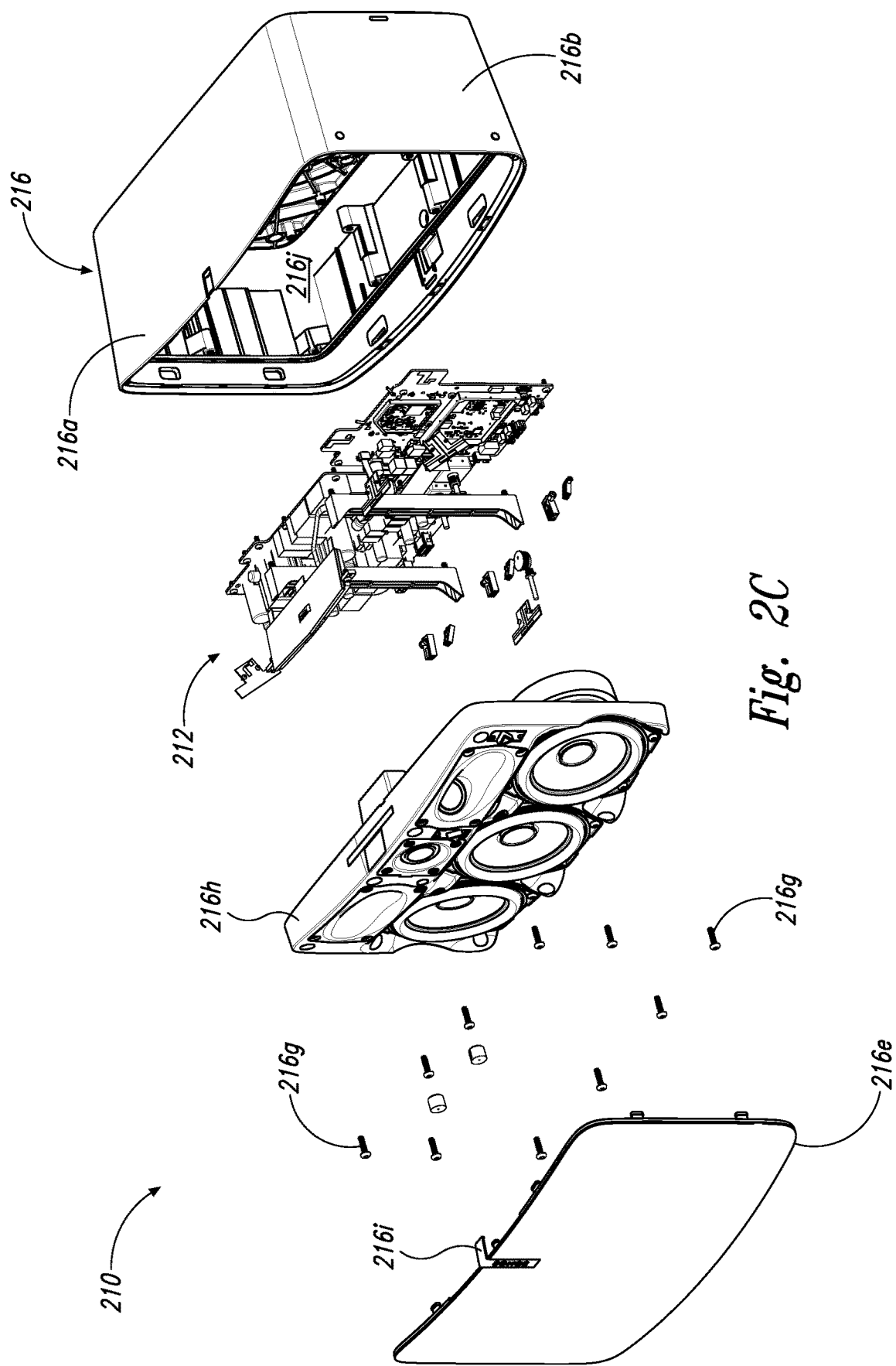
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
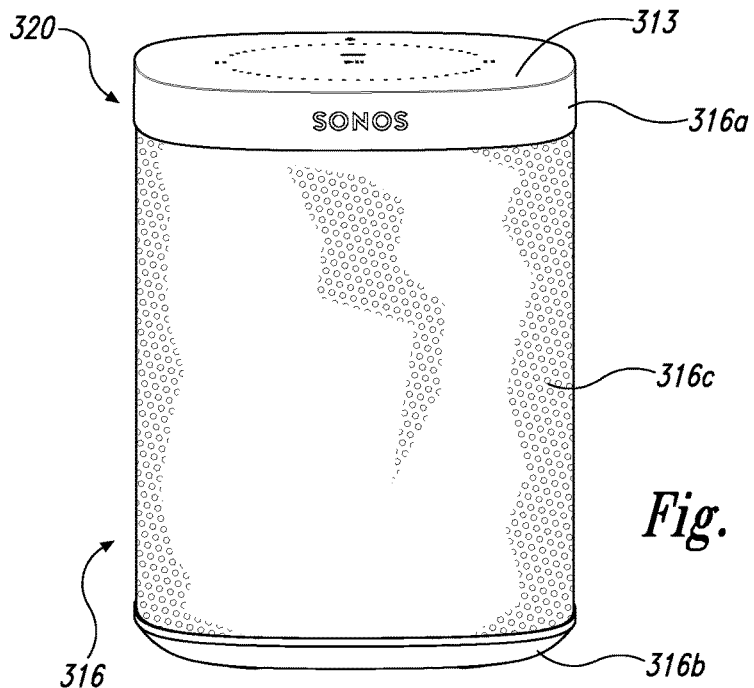
FIG. 3A is a front view of a network microphone device configured in accordance with aspects of the disclosed technology.
Figure 3B:
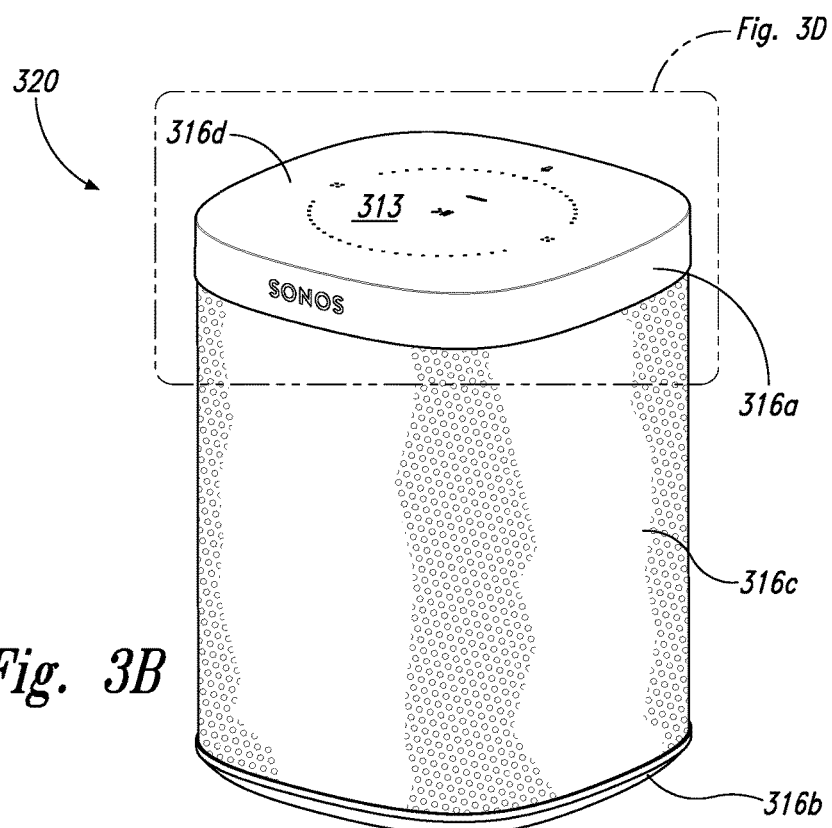
FIG. 3B is a side isometric view of the network microphone device of FIG. 3A.
Figure 3C:
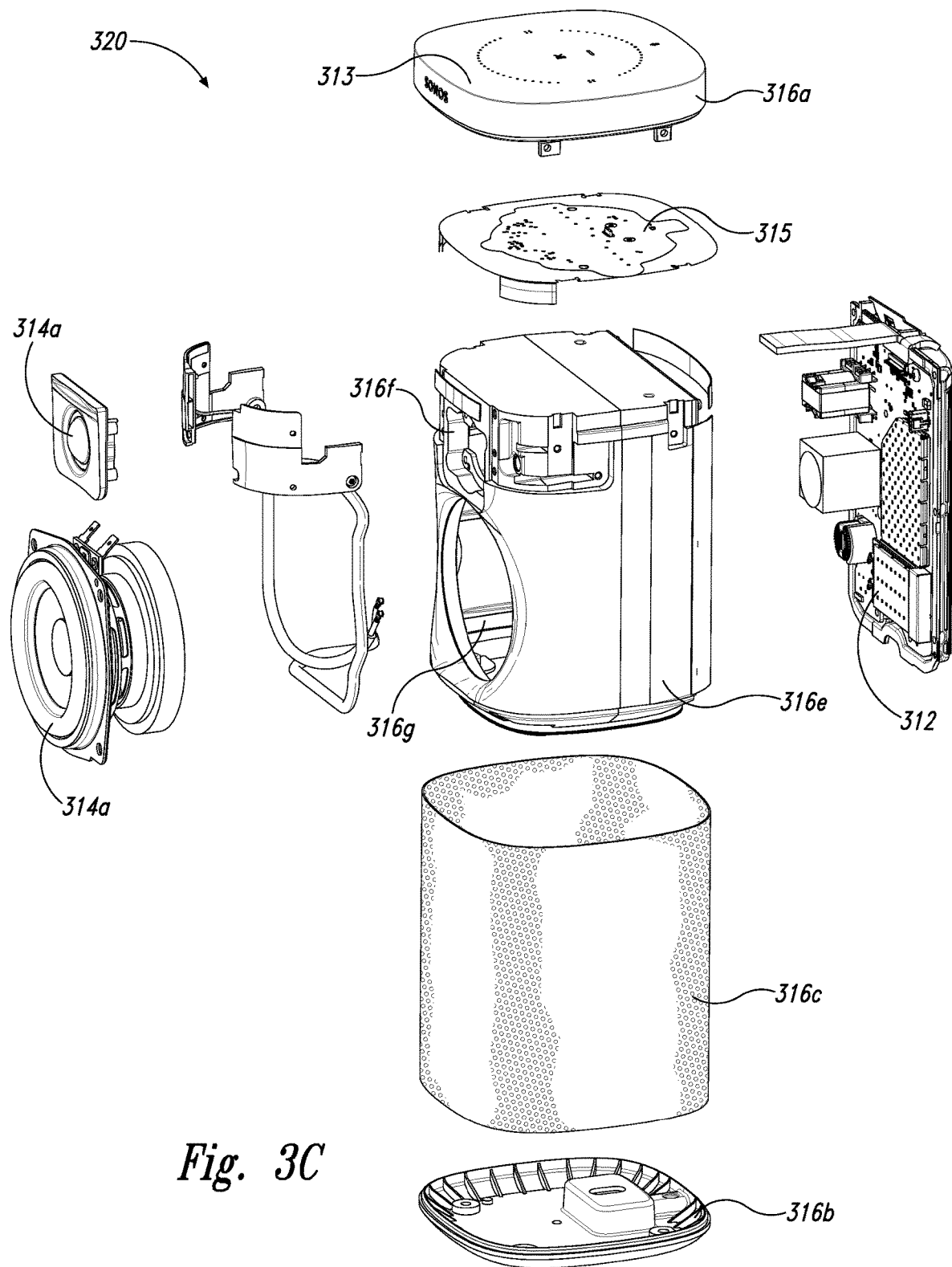
FIG. 3C is an exploded view of the network microphone device of FIGS. 3A and 3B.
Figure 3D:
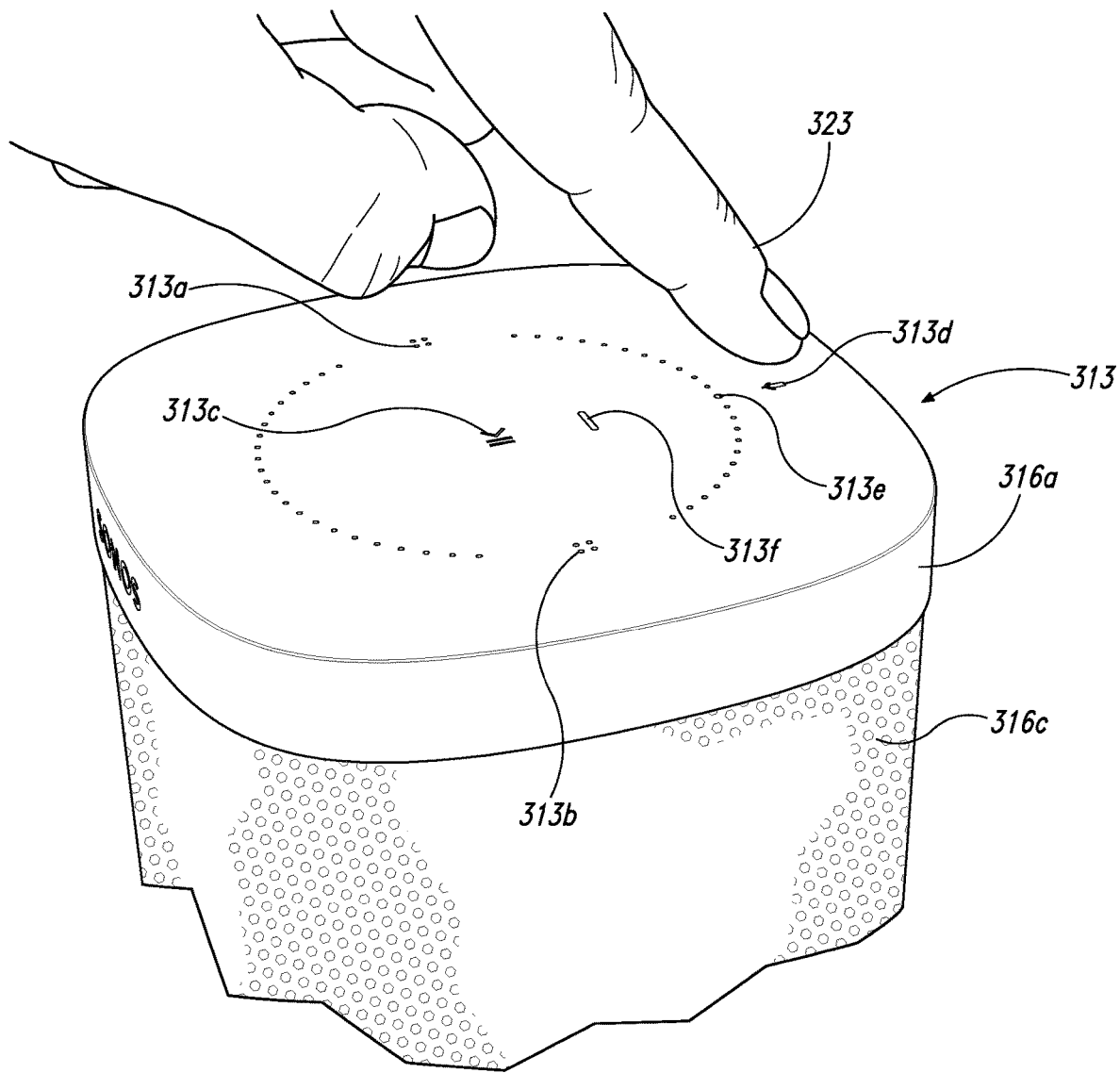
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes, or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
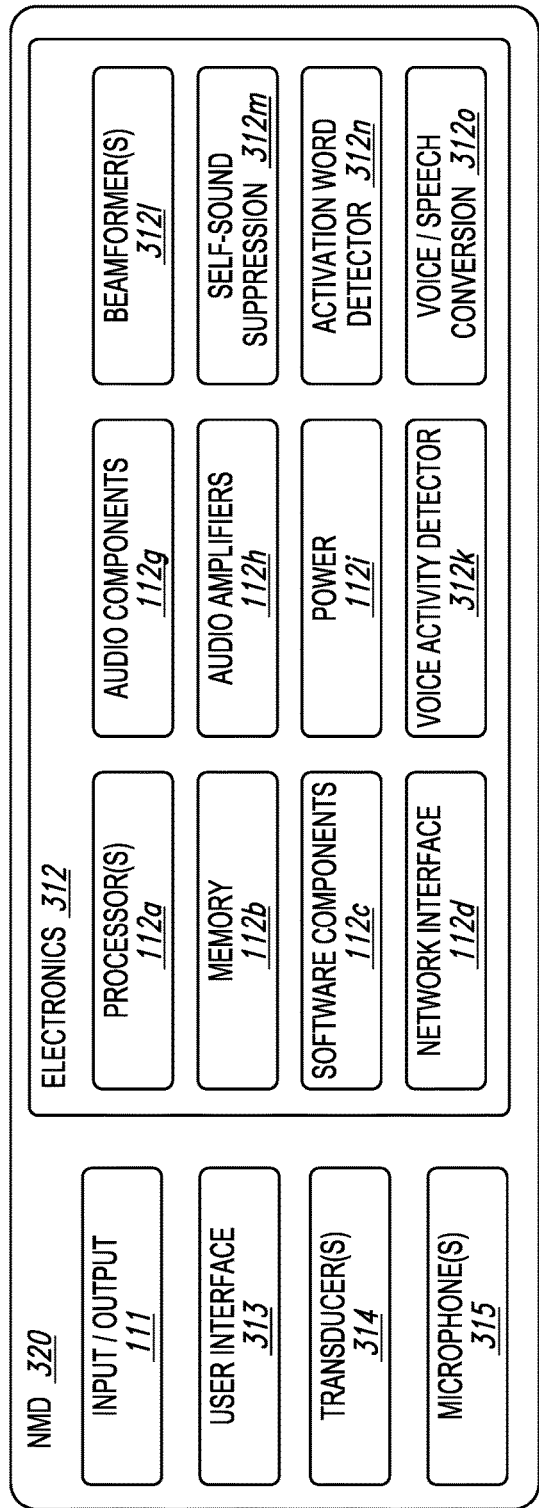
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
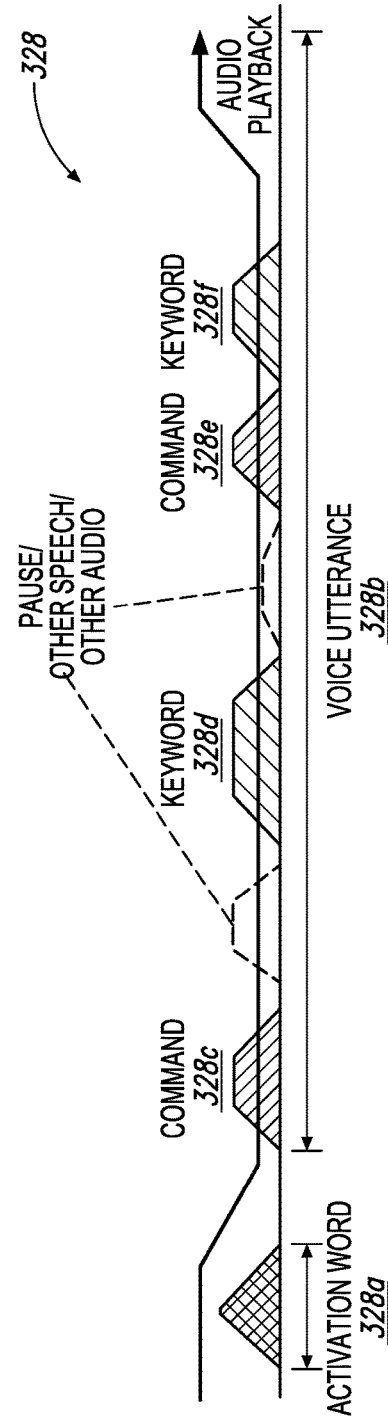
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328O. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
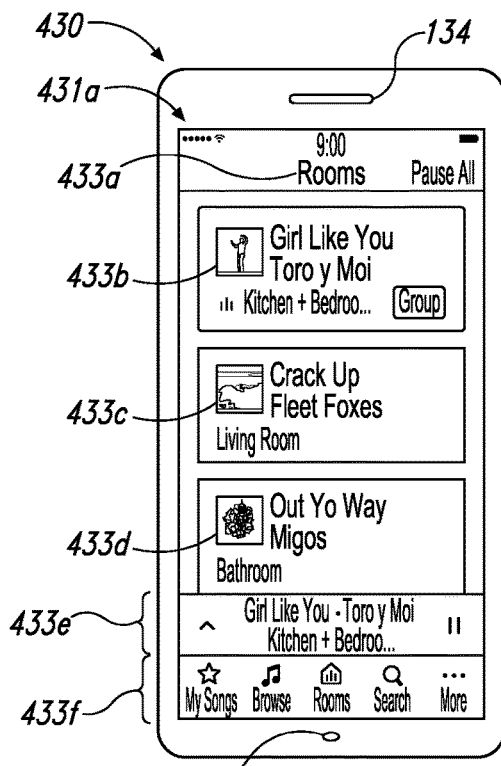
FIGS. 4A-4D are schematic diagrams of a control device in various stages of operation in accordance with aspects of the disclosed technology.
Figure 4B:
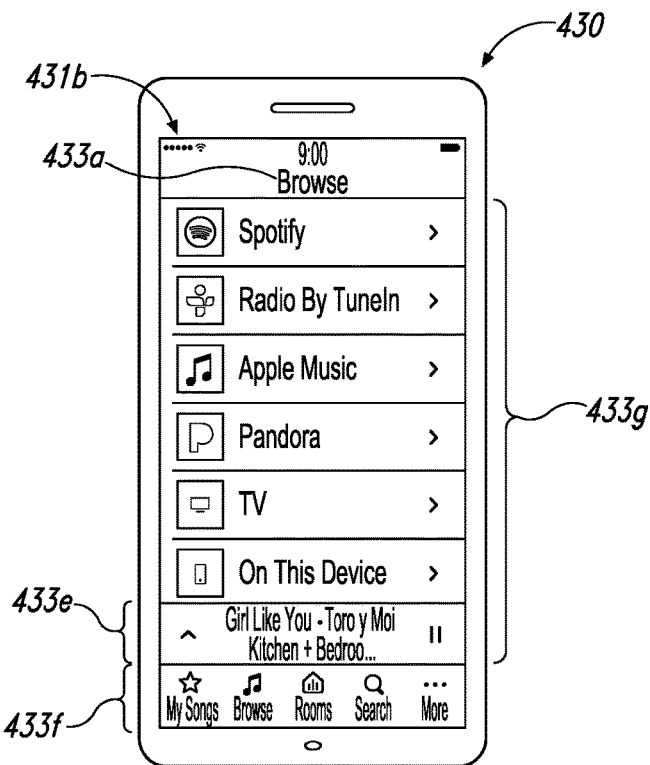
Figure 4C:
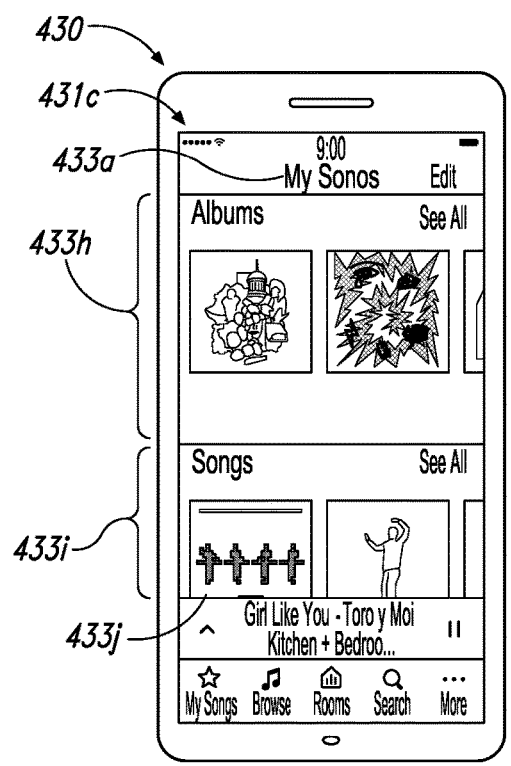
Figure 4D:
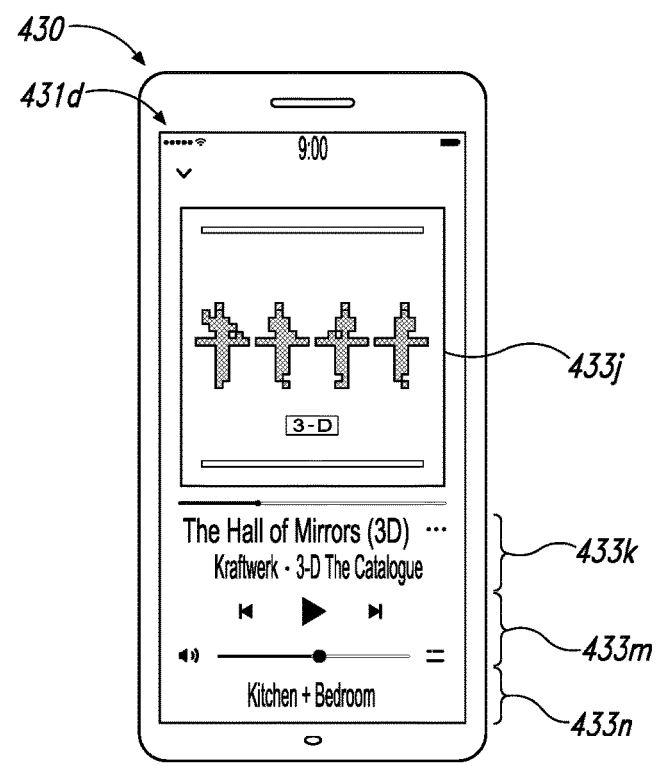

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by TuneIn, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
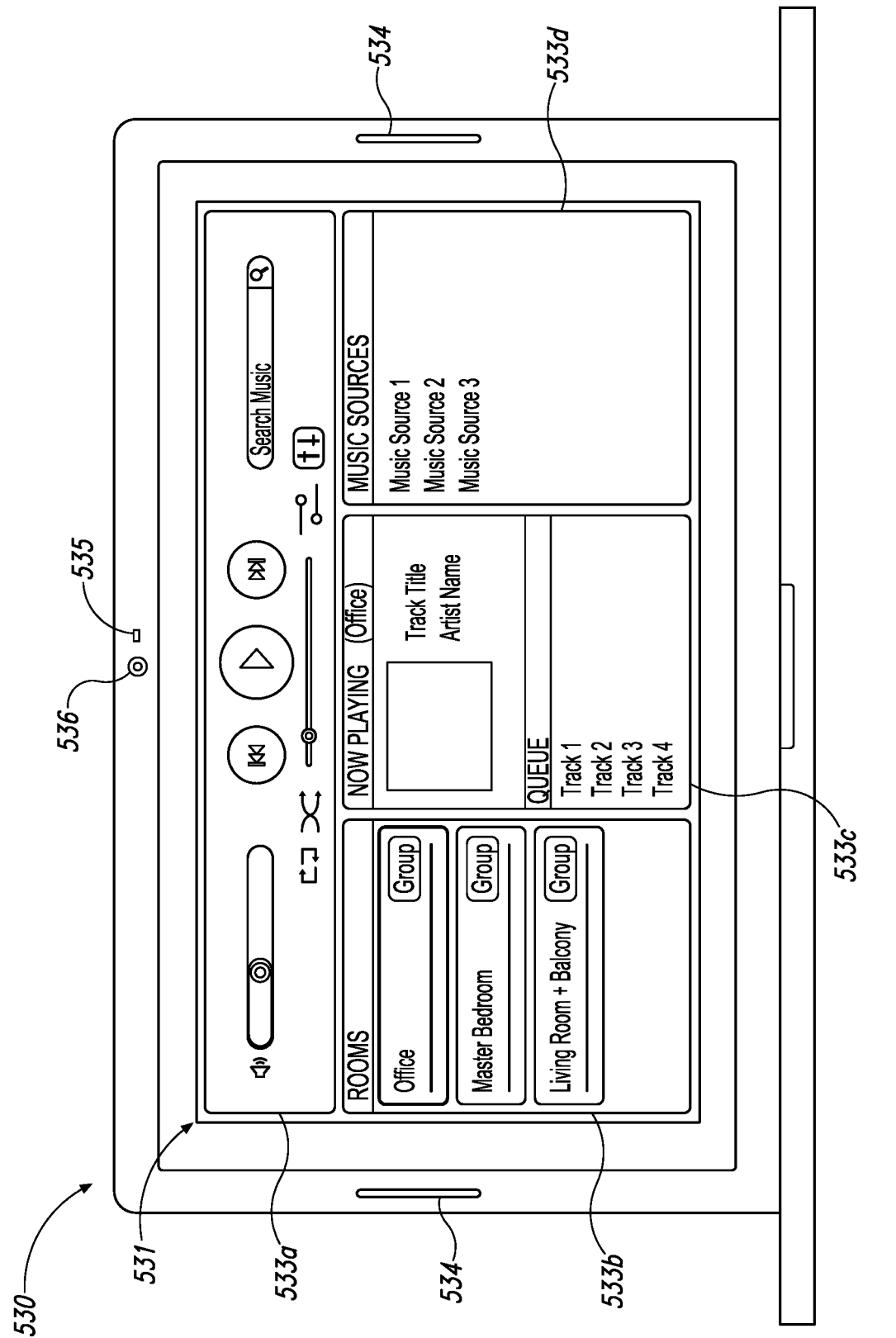
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, cross-fade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
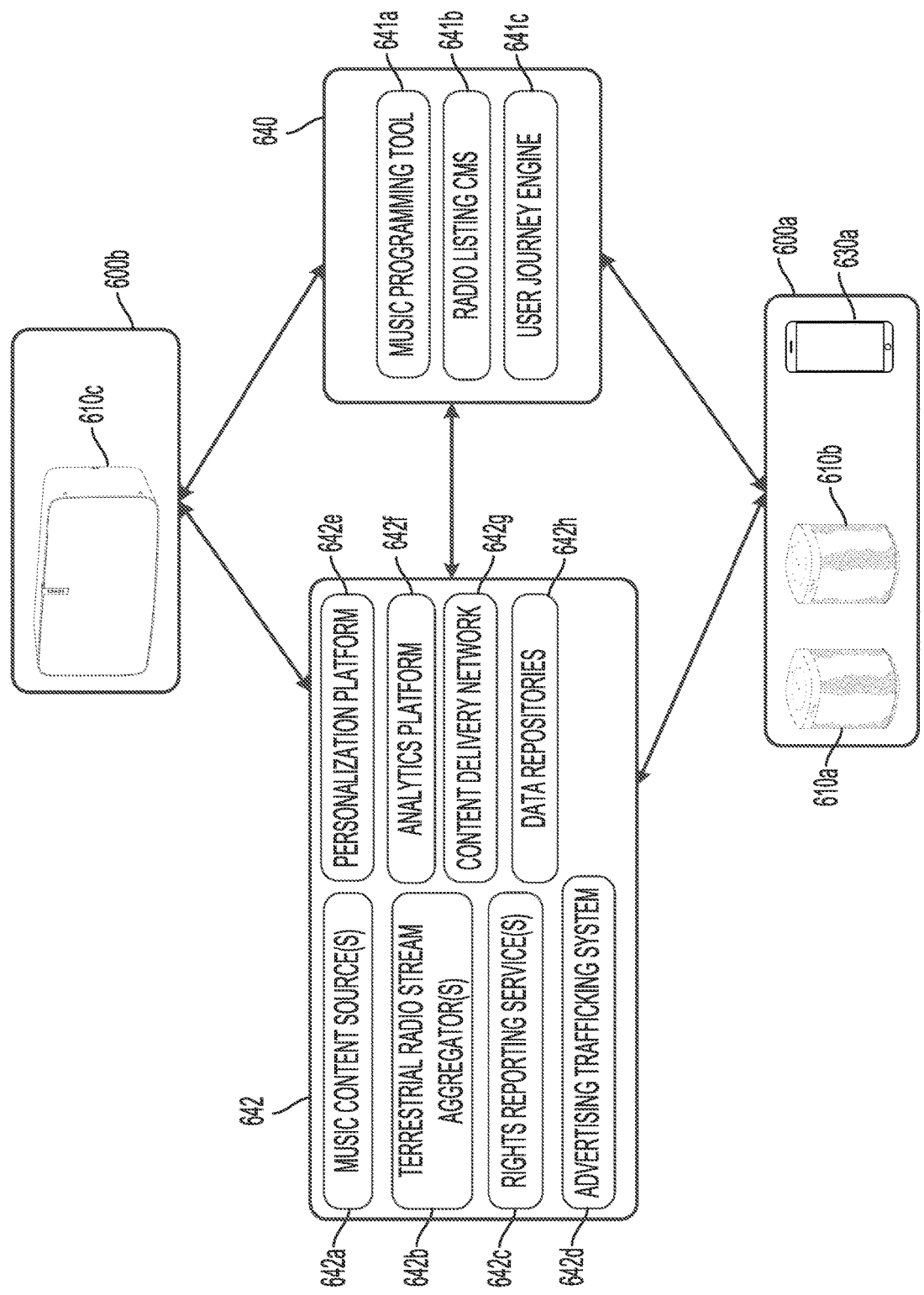
FIG. 6 is a schematic diagram of a computing system for providing internet radio content.

FIG. 6 is a schematic diagram of a computing system 640 that facilitates providing streaming media content, such as internet radio content, to one or more media playback systems as discussed herein. For example, the computing system 640 may include one or more computing devices, including the computing device(s) 106 of the cloud network(s) 102 shown in FIG. 2 and discussed above, which may facilitate providing a set of internet radio stations as well as other audio streaming services.

The computing system 640 may include a music programming tool 641*a* that may be used by administrators of a streaming media service and/or a media playback system provider (e.g., Sonos) to assemble and program the media content for each internet radio station's respective playlist. This may include, for each internet radio station, a scheduled playlist of media items for playback.

Further, in some implementations, the music programming tool 641*a* may also be used to assemble and maintain one or more priority media items for playback in association with the scheduled playlist for a given internet radio station. The one or more priority media items may be designated for priority playback during a predetermined time period such that, when a given playback device selects the given radio station for playback during the predetermined time period, the priority media items are first transmitted to the playback device for playback, followed by the regularly scheduled playlist of media items. In some implementations, after the given playback device has received and played back the priority media item(s), the priority media item(s) might not be transmitted to the given playback device again during the predetermined time period. Further examples involving the playback of priority media items in relation to the scheduled playlist of media items for a given internet radio station will be discussed in greater detail below with respect to FIG. 7.

The priority media item(s) discussed herein might represent various types of audio content. For instance, a priority media item might include a new episode of an artist-hosted radio show, among other types of original programming that might be developed for a given internet radio station. As another possibility, a priority media item might include a newly released song and may be used as a tool to showcase a new artist or album by greatly increasing the likelihood that listeners of the given internet radio station hear it. Similarly, a priority media item might include a message or advertisement from a sponsor of the given internet radio station, or from a media playback system provider. As yet another possibility, a priority media item might be used as a way to disseminate important information to the public, such as emergency information. Numerous other examples of priority media items are also possible.

Both the media items within a given scheduled playlist and the priority media item(s) maintained by the computing system 640 may take various forms, including a URI, a URL, or a similar identifier that allows a requesting playback device, upon receipt of the media item, to retrieve the associated audio content for playback from a media content source, which may be part of or separate from the computing system 640. Alternatively, the media items in a given playlist or a priority media item may take the form of audio content that is provided directly from the computing system 640 to a requesting playback device. In some implementations, a playlist maintained by the computing system 640 may include a combination of different kinds of media items, such as a combination of URIs and audio content. Other possibilities also exist.

Returning to FIG. 6, the computing system 640 may further include a radio listing content management system (CMS) 641*b*. The radio listing CMS may be used to find, verify, and store data regarding terrestrial radio streams that may be provided by one or more terrestrial radio stream aggregators.

The computing system 640 may also include a user journey engine 641*c*, which may utilize operational data from a given playback device, or from the media playback system of which the given playback device is a part, to make predictions regarding user interests and/or user activity within the media playback system, as appropriate. In some implementations, the user journey engine 641*c* may coordinate with other computing systems to make such predictions, as further discussed below.

FIG. 6 also shows a plurality of additional computing systems 642 with which the computing system 640 may integrate and/or cooperate. For example, the additional computing systems 642 include music content sources 642*a* operated by a respective music service, such as the example music services 433*g* discussed above (e.g., Spotify, etc.). In some implementations, for the internet radio content discussed herein, the media playback system provider itself (e.g., Sonos) may operate similar to the music services 433*g* discussed above, curating and assembling various playlists corresponding to the internet radio content and maintaining one or more of the media content source(s) 642*a* shown in FIG. 6. The additional computing systems 642 may also include terrestrial radio stream aggregators 642*b* and rights reporting services 642*c* that track the digital rights associated with given media content. For instance, unlike traditional terrestrial radio where it may be difficult to determine how many listeners were tuned in during playback of a given song, the implementations discussed herein can provide much more granular listener information. Operational data from one or more media playback systems may indicate, for example, how many playback devices played back a given song, where the playback devices were likely located, an estimation of user presence, among other information. In some cases, this additional information may be used to develop more specific arrangements and fee schedules for the licensing of digital content playback.

The additional computing systems 642 may also include an advertisement trafficking system 642*d*, a personalization platform 642*e*, and an analytics platform 642*f*, among many other possibilities. Further, the computing system 640 may cooperate with computing systems and networks that facilitate the data exchanges involved herein, including a content delivery network (CDN) 642*g*, and one or more data repositories 642*h*.

As discussed above, the operational data stored in data repositories 642*h* may include, for each media playback system, listening history corresponding to one or more playback devices and/or identified user profiles, the number, model(s), configuration(s), and/or playback settings of the playback devices in the media playback system, data regarding the media content sources available to the media playback system, indications of possible playback device locations within the media playback system, and indications of the likelihood of user presence, among other examples.

In some implementations, the user journey engine 641*c* may access the operational data stored in the data repositories 642*h* and then coordinate with one or both of the personalization platform 642*e* and the analytics platform 642*f* in order to analyze the data and make predictions regarding user interests and/or user activity within a given media playback system. For instance, operational data may be available from a substantial number of diverse media playback systems. The user journey engine 641*c* may work in conjunction with the analytics platform 642*f* to apply machine learning and/or other analytics to determine outcomes that are correlated with certain aspects of the operational data, and to predict future outcomes based on related or similar operational data. Further, the user journey engine 641*c* may further coordinate with the personalization platform 642*e* to apply trends and other predictive information discussed herein to any number of products, services, media content, and the like in a way that presents targeted advertisements that are more likely to be meaningful to particular users of a given media playback system. For example, a playlist for a given internet radio station may include designated time slots for advertisements that are provided as part of the internet radio station's programming.

Further, the data repositories 642*h* may additionally include a playback history for a given playback device or media playback system. The playback history for a given playback device or media playback system may incorporate media items that were played back across multiple different internet radio stations and playlists provided by computing system 640, as well as other user-controlled music streaming media services, local playback sources, and the like. Alternatively, the data repositories 642*h* might maintain playback history at the level of one or more user accounts, rather than at a device- or system-level. For example, a user account-level playback history may incorporate media content that a listener experienced across different media platforms.

FIG. 6 also shows a first media playback system 600*a* including playback device 610*a*, 610*b*, and control device 630*a*, and a second media playback system 600*b* including a third playback device 610*c*. Both the first media playback system 600*a* and the second media playback system 600*b* may communicate with the computing system 640, as well as one or more of the additional computing systems 642, during playback of content from an internet radio station. The computing system 640 maintains the playlist of media items for the internet radio station in a queue for playback, and may additionally maintain an indication of a current playback position within the playlist, which is always advancing.

To facilitate the discussion of implementations involving the playback of priority media items below, several examples will first be described that do not involve the playback of priority media items.

For instance, the playback device 610*a* may transmit a request to play back a scheduled playlist of media items associated with a given internet radio station maintained by the computing system 640. In response, the computing system 640 may provide an initial one or more media items from the scheduled playlist to the playback device 610*a*, along with an indication of the current playback position within the scheduled playlist. The current playback position may be, for example, a timestamp corresponding to a position within a given media item, or an indication of a particular audio frame within the given media content. The indications of the current playback position may take other forms as well.

In some cases, playback of the initial media item by the playback device 610a might not begin at the current playback position indicated by the computing system 640. Rather, to facilitate an improved listening experience, the computing system 640 may be configured to provide the initial media item to the playback device 610a for playback beginning from the start of the initial media item (e.g., from the first frame of media content). In this regard, the initial media item for transmission to the playback device 610a may be determined based on the how near the current playback position is to the beginning or end of a given media item within the scheduled playlist.

For example, if the current playback position maintained by the computing system 640 has advanced less than a threshold amount of a given media item's playback length within the scheduled playlist (e.g., one minute, less than half of the given media item's playback length, etc.), the computing system 640 may determine the given media item as the initial media item to transmit to the playback device 610a. As another example, if the current playback position maintained by the computing system 640 has advanced beyond a threshold amount of the given media item's playback length within the scheduled playlist (e.g., one minute, more than half of the given media item's playback length, etc.), the computing system 640 may determine the following media item in the scheduled playlist as the initial media item to transmit to the playback device 610a. Numerous other examples and possible criteria for determining the initial media item for playback are also possible.

Based on the above, a temporal offset may frequently be introduced between the current playback position maintained by the computing system 640 and the local playback position of playback device 610a within the playlist. Various implementations for reducing such temporal offsets will be discussed below.

In addition to maintaining the scheduled playlist of media items and the current playback position within the scheduled playlist, the computing system 640 may also maintain a priority media item that is associated with the scheduled playlist. As noted above, the priority media item may be designated for playback upon a given playback device's first request to play back the scheduled playlist of media items during a predetermined time period. Accordingly, rather than determining an initial media item to transmit for playback based on the current playback position, the computing system 640 may first transmit the priority media item for playback, and then determine a next media item from the scheduled playlist in a similar way, based on the playback length of the priority media item.

For instance, the playback device 610a may request to play pack the scheduled playlist of media items during the predetermined time period in which the priority media item is designated for playback. In response, the computing system 640 may determine that the playback device 610a has not previously requested to play back the scheduled playlist of media items during the predetermined time period and/or that that request is the first request from the playback device 610a during the predetermined time period. The computing system 640 may then transmit the priority media item to the playback device 610a for playback at a first time. Further, the computing system 640 may determine a next media item based on the current playback position within the scheduled playlist at the conclusion of the priority media item. For example, the computing system 640 may determine the next media item for playback at a second time that follows the first time by the playback length of the priority media item. Depending on the current playback position within the scheduled playlist at the second time (e.g., near the beginning or end of a given media item), the next media items may be determined as discussed above.

As noted previously, temporal offsets may frequently be introduced between the current playback position maintained by the computing system 640 and the local playback position of playback device 610a within the playlist. For instance, the playback device 610a in media playback system 600a and the playback device 610c in media playback system 600b might both be playing back the scheduled playlist of media items from the given internet radio station. Each playback device may have a respective local playback position that is offset from the current playback position maintained by the computing system 640. Further, this may result in an even greater total offset between the respective local playback positions. However, differences in playback timing of this kind, which might reach up to several minutes and would be unacceptable in a multi-room playback scenario, may not have any appreciable impact on listeners of the same internet radio station in separate media playback systems. Nonetheless the computing system 640 may undertake one or more corrections that may reduce the temporal offsets, such that the local playback position of each playback device that is playing back the scheduled playlist is in substantial synchrony with the current playback position maintained by the computing system 640.

A correction of the temporal offset(s) discussed above might take various forms, including the determination of one or more types of interstitial content and/or the adjustment of audio content that is played back by a given playback device.

As one example, the computing system 640 might determine interstitial content for playback by the playback device 610a between two or more upcoming media items in the scheduled playlist. For instance, the computing system 640 may determine, for a designated advertising time slot within the scheduled playlist, advertisements of differing length as a way to reduce playback timing differences between playback devices. For instance, if the playback device 610a has a local playback position that is lagging 5 seconds behind the indication of the current playback position that is maintained by the computing system 640, the computing system 640 may determine an advertisement for the playback device 610a that is only 10 seconds in length, whereas other playback devices that are playing back the internet radio content, such as the playback device 610c in the second media playback system, may be provided with advertisements that are 15 seconds in length.

As another possibility, the interstitial content might take the form of one or more brief periods of planned silence (e.g., 2.5 seconds), in a situation where the local playback position is determined to be ahead of the current playback position maintained by the computing system 640. For instance, if the playback device 610a has a local playback position that is 5 seconds ahead of the indication of the current playback position that is maintained by the computing system 640, the computing system 640 may determine a 2.5 second period of silence to be played following each the next two media items in the playlist. In this way, the playback device 610a may become resynchronized, or substantially resynchronized, with other playback devices that are playing the same internet radio station.

Other examples of interstitial content are also possible, including combinations of one or more of the above, and may be utilized in the corrected of larger temporal offsets than those discussed above.

As another example, the computing system 640 may correct for some temporal offsets by adjusting the audio content that is provided to the playback device 610a to correct for temporal offsets between the current playback position maintained by the computing system 640 and a playback device's local playback position. For example, the computing system 640 may timestretch the audio content of a song, or a portion thereof, to increase or decrease its tempo without changing its pitch, and then provide the adjusted audio content to the playback device 610a while other playback devices receive unadjusted content. As above, this may allow the playback device 610a may become resynchronized, or substantially resynchronized, with the current playback position maintained by the computing system 640 and other playback devices that are playing the same internet radio station.

Additionally or alternatively, the playback device 610a may determine that its local playback position within the playlist of media items is offset from the current playback position indicated by the computing system 640 by more than a threshold value, such as 5 seconds. In response, the playback device 610a may undertake a similar adjustment of the audio content that is received from the computing system 640. For example, the playback device 610a may timestretch the audio content to increase or decrease its tempo as discussed above, and then play back the adjusted audio content to thereby reduce the difference in its playback position.

The computing system 640 and/or the playback device 610a may account for temporal offsets in various other ways as well, including combinations of any of the above. Further, it should be understood that temporal offsets between the local playback position of playback device 610a and the indication of the current playback position maintained by the computing system 640 might be introduced by other factors as well, such as local network conditions that may result in drift of the local playback position. For example, the media playback system 600a may experience network attenuation that delays the retrieval of media content from the media content source 642a, causing the playback device 610a to fall behind the current playback position maintained by the computing system 640. For this reason, the computing system 640 might periodically determine whether a temporal offset has exceeded a given threshold, and/or send an updated indication of the current playback position to the playback device 610a, which may allow the playback device 610a to determine if its local playback position has drifted beyond a predetermined threshold.

Additional details regarding providing streaming media content, such as internet radio content, to one or more media playback systems can be found, for example, in U.S. application Ser. No. 16/680,232 filed Nov. 11, 2019 and titled "Media Content Based on Operational Data," which is hereby incorporated by reference in its entirety.

IV. Example User Experiences Associated with Priority Media Items

Figure 7:
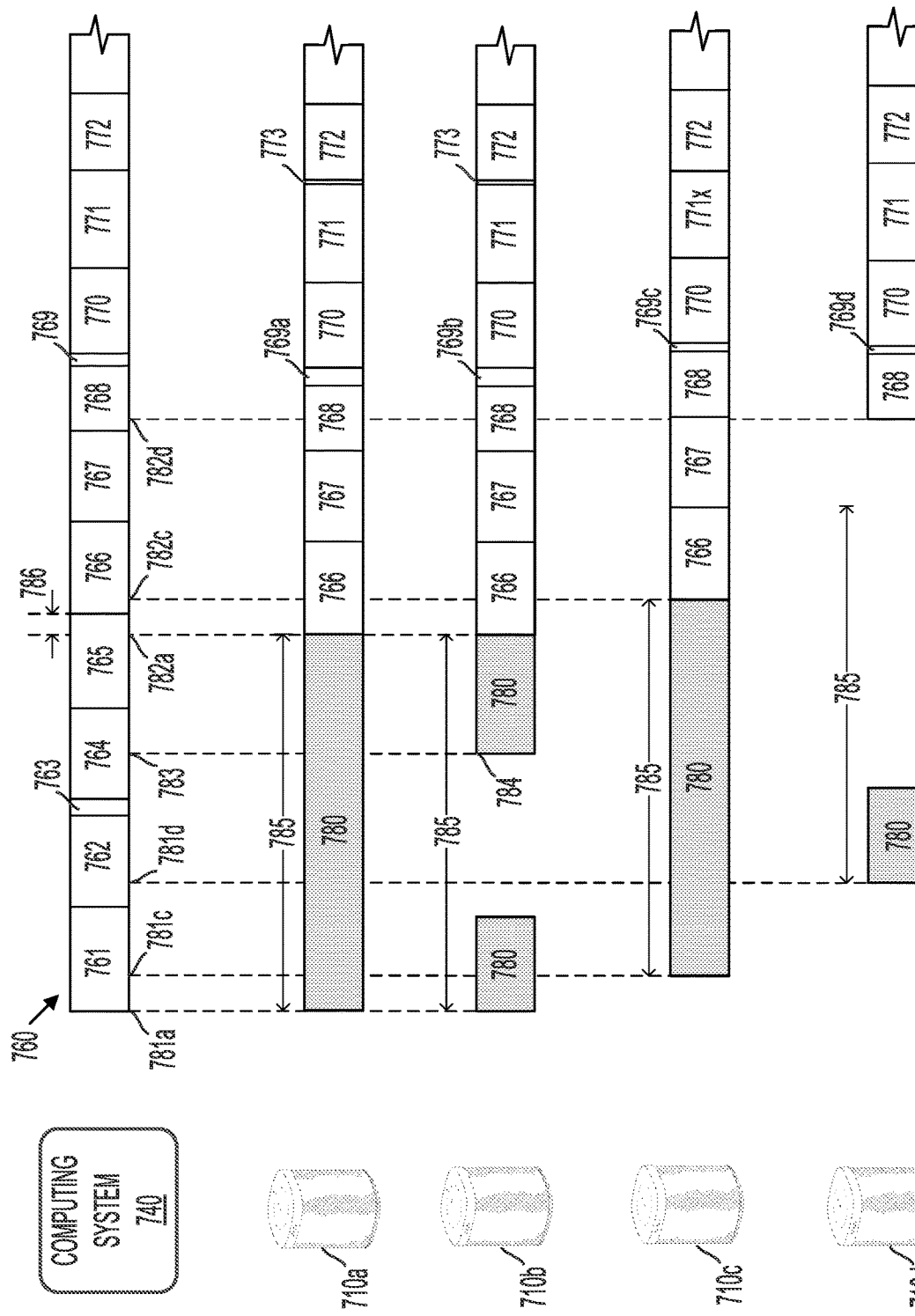
FIG. 7 is a schematic diagram of a plurality of playback devices playing back a priority media item as part of a playlist of media items.

FIG. 7 is a schematic diagram of a computing system that maintains a scheduled playlist of media items for playback by various playback devices, and will inform the discussion of some example user experiences that may be facilitated by the systems and operations herein.

For instance, FIG. 7 shows a graphical representation of a playlist of media items 760 that is maintained by a computing system 740. In this regard, the computing system 740 may be similar to or the same as the computing system 640 discussed above and shown in FIG. 6. The playlist 760 may correspond to various different types of streaming media content such as an internet radio station, among other possibilities. As shown in FIG. 7, the playlist 760 as maintained by computing system 740 contains individual media items 761 through 772. As noted above, the computing system 740 may also maintain a current playback position within the scheduled playlist of media items. While the scheduled playlist shown in FIG. 7 is available for playback, as in the examples discussed below, the current playback position is always advancing.

Additionally, the computing system 740 may maintain a priority media item 780 having a playback length 785 for playback by one or more playback devices. The computing system 740 may maintain the priority media item 780 for a predetermined time period, which may correspond to a promotional period or some other window of time (e.g., 24 hours, one week, etc.) in which listeners have the opportunity to experience the priority media item 780.

FIG. 7 also shows a playback device 710a, which may take the form of any of the playback devices shown in the Figures herein and discussed above. Playback device 710a may be operating as a part of media playback system similar to the media playback system 100 shown in FIG. 1, or the media playback system 600a shown in FIG. 6. Further, FIG. 7 shows additional playback devices 710b, 710c, and 710d, each of which may operate as part of its own respective media playback system.

In the examples discussed below, each of the playback devices shown in FIG. 7 transmits a request to play back the scheduled playlist 760, resulting in the respective sequences of media items 760a, 760b, 760c, and 760d that represent the media items received by each respective playback device from the computing system 740. In this regard, the horizontal orientation of FIG. 7 from left to right corresponds to the passage of time, and items that are vertically aligned (e.g., the beginning and ending of a given media item) occur at substantially the same time, as discussed above.

In a first example, the computing system 740 receives, from the playback device 710a, a request to play back the scheduled playlist 760. In turn, the computing system 740 may determine that the request from the playback device 710a is a first request to play back the scheduled playlist 760 during a predetermined period for which the priority media item 780 is designated for playback. Accordingly, the computing system may transmit the priority media item 780 to the playback device 710a for playback beginning at a first time 781a, as shown in FIG. 7.

Alternatively, the computing system 740 may determine that the request by playback device 710a is a second or subsequent request. For instance, the computing system 740 may store an indication of a previous, first request from playback device 710a. Additionally or alternatively, the computing system 740 may receive some other indication that the playback device 710a has already played back the priority media item 780 during the predetermined time period. As another possibility, the computing system 740 might receive an indication that a user account currently associated with the playback device 710a has requested and experienced the priority media item 780 via a different media platform, perhaps via a different playback device located in a different media playback system. In these situations, the computing system 740 may forego transmitting the priority media item 780 to the playback device 710*a* and instead transmit an initial media item for playback from the scheduled playlist 760, such as media item 761.

As noted above, the computing system 740, either alone or in conjunction with one or more other devices (e.g., computing devices 642), might maintain a playback history at a user account-level, which might more closely capture a listener's personal playback history than a device- or system-focused playback history.

Returning to FIG. 7, the computing system 740 may determine a next media item from the scheduled playlist 760 for playback by the playback device 710*a*. For instance, the computing system 740 may determine the next media item based on the current playback position within the scheduled playlist 760 at a second time 782*a* that follows the first time 781*a* by at least the length 785 of the priority media item 780. As shown in FIG. 7, at the end of priority media item 780, the current playback position at time 782*a* is near the end of media item 765. As discussed above, this may be greater than a threshold amount of the playback length of media item 765 such that the computing system 740 may determine media item 766 to be the next media item for playback by the playback device 710*a*. Accordingly, the computing system 740 may transmit (e.g., while the playback device 710*a* is still playing back the priority media item 780), at least the media item 766 to the playback device 710*a* for playback after the priority media item 780.

As noted above, transmitting media item 766 for playback by the playback device 710*a* from its beginning may result in a temporal offset between the current playback position maintained by the computing system within the scheduled playlist 760 and the local playback position of the playback device 710*a* within the sequence of media items 761*a*. This can be seen in FIG. 7 as the temporal offset 786 between the scheduled start time of media item 766 and the local start time of media item 766, as played back by the playback device 710*a*.

In response, the computing system 740 may determine interstitial content for playback by the playback device 710*a* that will result in a reduction in the temporal offset 786. For instance, as shown in FIG. 7, the scheduled playlist 760 may include a time slot 769 that may be designated for targeted advertisements. The time slot 769 may have a scheduled playback length, such as 15 seconds. However, the computing system 740 may determine an advertisement 769*a* that is 20 seconds in length for playback by the playback device 710*a*. Accordingly, the 5 second difference may result in a reduction in the temporal offset 786.

As another example, the computing system 740 may determine interstitial content such as media item 773 that includes silence or a background sound (e.g., ocean waves) and has a playback length of a few seconds. The computing system 740 may then transmit the media item 773 for playback by the playback device 710*a* between media items 771 and 772, as shown in the sequence 760*a* in FIG. 7. Accordingly, the temporal offset 786 may be further reduced, and the local playback position of playback device 710*a* may begin to approach the current playback position maintained by the computing system 740.

As another example, the computing system 740 may receive a request from playback device 710*b* to play back the scheduled playlist 760. As shown in FIG. 7, the computing system 740 may receive the request from playback device 710*b* at roughly the same time as the request from playback device 710*a*, and therefore may transmit the priority media item 780 to the playback device 710*b* for playback beginning at the same first time 781*a*.

After transmitting the priority media item 780, the computing system 740 may maintain an indication of a local playback position within the priority media item 780 for the playback device 710*b*. Further, the computing system 740 might maintain the indication of the local playback position even if the playback device 710*b* continues playing back the priority media item 780, as shown in FIG. 7. For instance, the computing system 740 may receive a request from the playback device 710*b* to discontinue playback of the priority media item 780. Additionally or alternatively, the playback device 710*b* might request to play back a different playlist of media items (e.g., for a different internet radio station).

Thereafter, at a third time 783 that follows the first time 781*a* by less than the playback length 785 of the priority media item 780, the computing system 740 may receive a second request from the playback device 710*b* to play back the scheduled playlist 760. Based on the second request, the computing system 740 may transmit the priority media item 780 to the playback device 710*b* for playback beginning at the local playback position 784 within the priority media item 780 that corresponds to the third time 783. This can be seen in FIG. 7, where playback of the priority media item 780 resumes at the local playback position it would have reached had the playback device 710*b* not discontinued playback.

Using the local playback position of playback device 710*a* as a reference for illustration purposes, it can be seen that the playback device 710*b*, which requested to play back the scheduled playlist 760 at roughly the same time as playback device 710*a*, also finishes playback of the priority media item 780 and proceeds to media item 766 at roughly the same time as the playback device 710*a*. Accordingly, the computing system 740 may determined the same temporal offset 786 between the local playback position of playback device 710*b* and the current playback position, and may therefore determine the same or similar interstitial content to reduce the temporal offset, such as a lengthier advertisement 769*b* and the media item 773.

In some implementations, the playback device 710*b* might play back the priority media item 780 for less than a threshold length of time (e.g., 30 seconds) before requesting to discontinue playback at a third time. In response, the computing system 740 might not store an indication of a first request to play back the scheduled playlist 760 by the playback device 710*b*. Accordingly, if the computing system 740 receives a second request to play back the scheduled playlist 760, from the playback device 710*b* at a fourth time following the third time, the computing system 740 may transmit the priority media item 780 to the playback device 710*b* for playback from the beginning.

Referring still to the example of playback device 710*b*, in some implementations, the priority media item 780 may include two or more media items. For instance, the priority media item 780 shown in FIG. 7 may represent two or more media items that are to be played in sequence. As another possibility, the priority media item 780 may be a radio show or similar program featuring the playing of multiple songs during its run time. Accordingly, the priority media item 780 may include timestamps or other markers that indicate points within the priority media item 780 at which each song begins. Other examples are also possible.

In some implementations, and with respect to the example of FIG. 710*b*, subdivisions within a given priority media item may be used as a starting point to resume playback of the priority media item at the beginning of a given media item. In this regard, the starting point may be selected in a manner that is similar to how an initial media item or a next media item is selected from the scheduled playlist as discussed above.

Returning to FIG. 7, another example is shown in which the computing system 740 receives, from playback device 710c, a request to play back the scheduled playlist 760 after the playback devices in both previous examples. Accordingly, the computing system 740 may transmit the priority media item 780 for playback beginning at a first time 781c and then determine a next media item for playback based on the current playback position within the scheduled playlist 760 at second time 782c.

As shown in FIG. 7, the current playback position within the scheduled playlist 760 at second time 782c is within media item 766, however, it may be less than a threshold amount of the playback length of media item 766. Accordingly, the computing system 740 may transmit the media item 766 to the playback device 710c as a next media item for playback after the priority media item 780. Similar to the first two examples, this may result in a temporal offset between the local playback position of the playback device 710c, represented by the sequence of media items 760c, and the current playback position maintained by the computing system 740. However, unlike the first two examples, the temporal offset in this case results in the local playback position being "behind" the current playback position. Accordingly, there may be fewer options for determining interstitial content to reduce the temporal offset, and other corrections may be employed.

For instance, the computing system 740 may determine, for the advertising time slot 769, a shortened advertisement 769c that is 10 seconds in length, rather than the scheduled 15 seconds. The 5 second different may result in a reduction in the temporal offset.

Further, the computing system 740 may adjust the media content corresponding to media item 771 for playback by the playback device 710c. In particular, the computing system 740 may timestretch the media content to increase its tempo slightly (e.g., by 2%) while maintaining the same pitch. This may have the effect of modifying media item 771, as played back by playback device 710c, to have a shortened playback length, shown in FIG. 7 as adjusted media item 771x. Other corrections are also possible.

Yet another example is shown in FIG. 7, in which the computing system 740 receives a request to play back the scheduled playlist 760 from playback device 710d. As in the previous example, the computing system 740 may determine that the request is a first request in the predetermined time period, and thus the computing system 740 transmits the priority media item 780 to the playback device 710d for playback beginning at a first time 781d, which is later in time than each of the examples above.

After the playback device 710d plays back the priority media item 780 for some period of time, the computing system 740 may receive a request to discontinue playback of the priority media item 780, as shown in FIG. 7. This may correspond to the computing system 740 receiving a request from the playback device 710d to play back a different scheduled playlist for a different internet radio station, among other examples. However, unlike the example of playback device 710b, the computing system 740 might not receive a second request from the playback device 710d to play back the scheduled playlist 760 until, after the priority media item 780 would have concluded, had the playback device 710d continued playing it.

Accordingly, based on the second request, the computing system 740 may transmit an initial media item to the playback device 710d for playback from the scheduled playlist 760 according to the examples above. For instance, based on the current playback position within the scheduled playlist, the computing system 740 may transmit media item 768 to the playback device 710d for playback beginning at a second time 782d. As above, a temporal offset may be determined and the computing system 740 may determine interstitial content, such as a shortened advertisement 769d, to reduce the offset.

As discussed above, the computing system 740 shown in FIG. 7 maintains a priority media item 780 for playback for a predetermined time period. In some implementations, when the predetermined time period ends, the priority media item 780 may be replaced with a second priority media item. For instance, the second priority media item may be the next episode in a weekly series, or the next media item scheduled for promotion, among other possibilities.

Accordingly, a new predetermined time period for the second priority media item may begin. Further, any indication of a first request by the playback devices shown in FIG. 7 to playback the scheduled playlist 760 may be reset, such as that a subsequent request to play back the scheduled playlist will be treated as the first request in the new predetermined time period.

In some implementations, the priority media item 780 might also be made available for playback based on a user selection of the priority media item 780. For instance, following the predetermined time period during which the priority media item 780 was designated for playback in association with the scheduled playlist 760 (and perhaps also during the predetermined time period), the priority media item 780 may be added to a media content channel or similar media streaming station through which a listener can select specific content for playback. For instance, the priority media item 780 may be added to an archive of other, previous priority media items (e.g., previous episodes of a series). In this way, a listener may access the streaming media archive to experience the priority media item 780 again, or perhaps experience it in full if the listener was interrupted when the priority media item 780 was presented in conjunction with the scheduled playlist 760. Various other implementations may exist that allow a listener to select the priority content 780 for playback.

Figure 8:
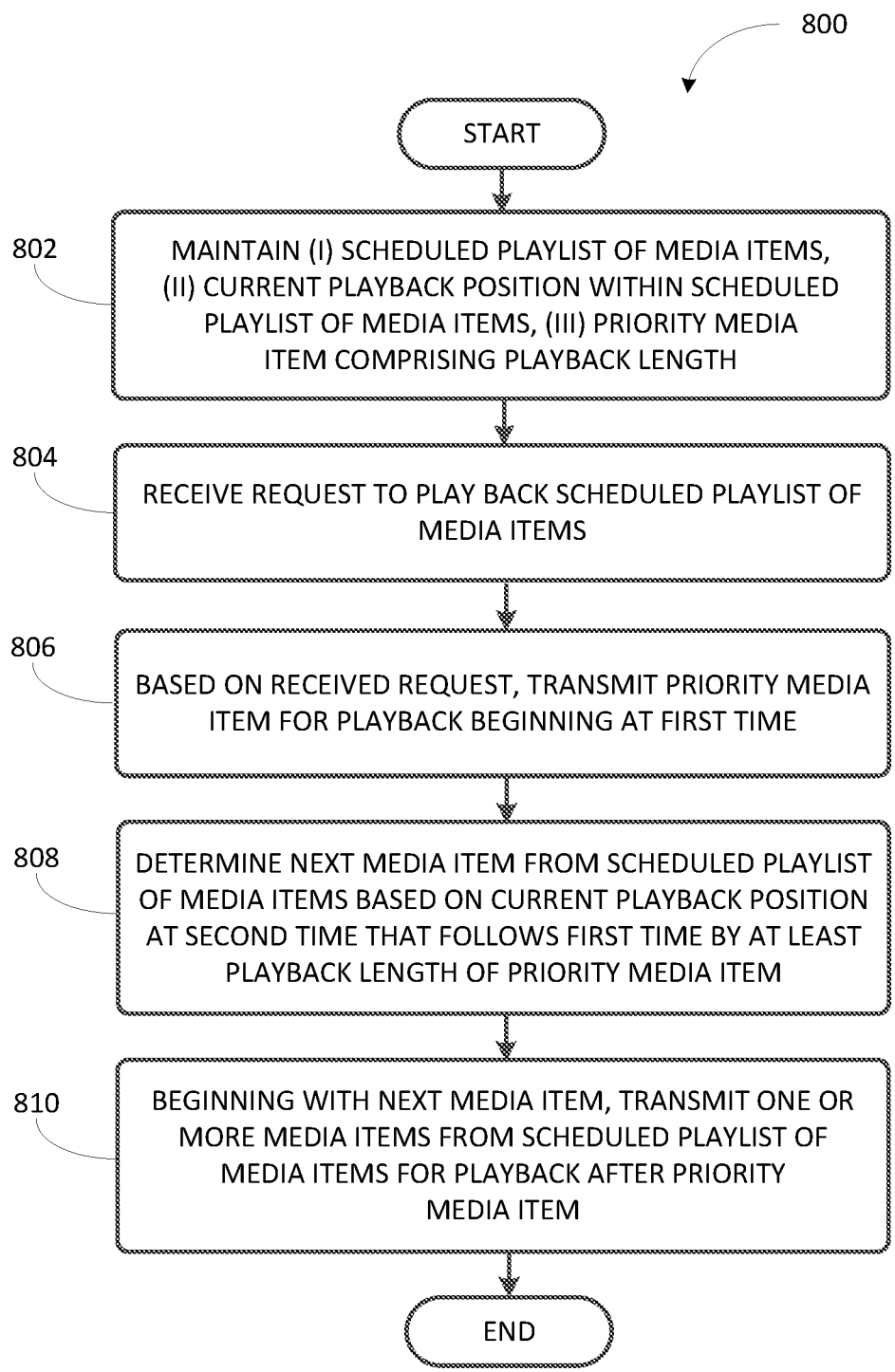
FIG. 8 is a flowchart of an example method for providing a priority media item as part of a playlist.

Turning now to FIG. 8, a flowchart is shown of an example method 800 for maintaining and providing counterpart media items as part of a playlist. The method 800 may be carried out by the computing system 740 shown in FIG. 7, either alone or in combination with one or more other computing systems, as discussed above. Further, although the computing system shown in FIG. 7 is generally directed to facilitating playback of one or more internet radio stations, it should be understood that the method 800 may be used in other contexts as well, including various other streaming and non-streaming media contexts.

At block 802, the computing system 740 maintains a scheduled playlist of media items, such as the scheduled playlist 760, for playback by one or more playback devices. Further, the computing system 740 maintains a current playback position within the scheduled playlist 760. Still further, the computing system 740 maintains a priority media item having a playback length for playback by one or more playback devices that may request to play back the scheduled playlist 760. In some implementations, the priority media item may be maintained for a limited, predetermined time period, after which it may be removed and/or replace with an updated, second priority media item.

At block 804, the computing system 740 receives, from a playback device over a communication network, a request to play back the scheduled playlist 760, as shown in each of the examples in FIG. 7.

At block 806, based on the received request, the computing system 740 transmits the priority media item to the playback device for playback beginning at a first time. In some implementations as otherwise discussed herein, computing system 740 and/or another computing system (e.g., one or more of the computing systems 642 shown in FIG. 6) may store an indication that a given playback device has requested to play back the scheduled playlist 760. In this way, the computing system 740 may transmit the priority media item to a given playback device only once during the predetermined time period.

At block 808, the computing system 740 determines a next media item from the scheduled playlist 760 based on the current playback position within the scheduled playlist at a second time that follows the first time by at least the playback length of the priority media item.

At block 810, beginning with the next media item, the computing system 740 transmits one or more media items from the scheduled playlist of media items to the playback device for playback after the priority media item. As shown in FIG. 7 and discussed above, the next media item may be transmitted for playback beginning from the start of the next media item such that a temporal offset is introduced between the current playback position maintained by the computing system 740 and a local playback position of the playback device. Accordingly, the computing system 740 may determine one or more corrections to be applied during playback of the scheduled playlist 760 in order to reduce the temporal offset.

FIG. 8 includes one or more operations, functions, or actions as illustrated by one or more of blocks 802-810, respectively. Although the blocks are illustrated in sequential order, some of the blocks may also be performed in parallel, and/or in a different order than those described herein. Also, the various blocks may be combined into fewer blocks, divided into additional blocks, and/or removed based upon the desired implementation.

In addition, for the message flow diagram in FIG. 8 and other processes and methods disclosed herein, the diagram shows functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 8 may represent circuitry and/or machinery that is wired or arranged to perform the specific functions in the process.

V. CONCLUSION

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A cloud-based computing system comprising:
at least one processor; at least one non-transitory computer-readable medium; and program instructions stored on the at least one non-transitory computer-readable medium that are executable by the at least one processor such that the cloud-based computing system is configured to:

maintain (i) a scheduled playlist of media items for playback by one or more playback devices, (ii) a current playback position within the scheduled playlist of media items, and (iii) a priority media item for playback by the one or more playback devices; while the current playback position within the scheduled playlist of media items is advancing, receive, from a playback device associated with a user account, a request to play back the scheduled playlist of media items;

determine that the user account has not been associated with any playback device that previously played back the priority media item within a given period of time; and based on determining that the user account has not been associated with any playback device that previously played back the priority media item within the given period of time, transmit the priority media item to the playback device associated with the user account for playback beginning before playback of any media item from the scheduled playlist of media items by the playback device associated with the user account.

2. The cloud-based computing system of claim 1, wherein:

the playback device associated with the user account is a first playback device associated with a first user account;

the request to play back the scheduled playlist of media items is a first request to play back the scheduled playlist of media items; and the cloud-based computing system further comprises program instructions stored on the at least one non-transitory computer-readable medium that are executable by the at least one processor such that the cloud-based computing system is configured to:

after transmitting the priority media item to the first playback device associated with the first user account, receive, from a second playback device associated with a second user account, a second request to play back the scheduled playlist of media items;

determine that the priority media item should not be transmitted to the second playback device associated with the second user account; and after determining that the priority media item should not be transmitted to the second playback device associated with the second user account, transmit one or more media items from the scheduled playlist of media items, without transmitting the priority media item, to the second playback device associated with the second user for playback based on the current playback position within the scheduled playlist of media items.

3. The cloud-based computing system of claim 2, further comprising program instructions stored on the at least one non-transitory computer-readable medium that are executable by the at least one processor such that the cloud-based computing system is configured to:

determine that the second playback device associated with the second user account played back the priority media item for more than a threshold period of time; and wherein the program instructions that are executable by the at least one processor such that the cloud-based computing system is configured to transmit the one or more media items from the scheduled playlist of media items, without transmitting the priority media item, to the second playback device associated with the second user account for playback comprise program instructions that are executable by the at least one processor such that the cloud-based computing system is configured to transmit the one or more media items from the scheduled playlist of media items, without transmitting the priority media item, to the second playback device associated with the second user account for playback further based on the determination that the second playback device associated with the second user account played back the priority media item for more than the threshold period of time.

4. The cloud-based computing system of claim 2, further comprising program instructions stored on the at least one non-transitory computer-readable medium that are executable by the at least one processor such that the cloud-based computing system is configured to: store an indication of the first request to play back the scheduled playlist of media items; and wherein the program instructions that are executable by the at least one processor such that the cloud-based computing system is configured to transmit the one or more media items from the scheduled playlist of media items, without transmitting the priority media item, to the second playback device associated with the second user account for playback comprise program instructions that are executable by the at least one processor such that the cloud-based computing system is configured to transmit the one or more media items from the scheduled playlist of media items, without transmitting the priority media item, to the second playback device associated with the second user account for playback further based on the stored indication of the first request.

5. The cloud-based computing system of claim 4, wherein the priority media item is a first priority media item, the cloud-based computing system further comprising program instructions stored on the at least one non-transitory computer-readable medium that are executable by the at least one processor such that the cloud-based computing system is configured to:

replace the first priority media item with a second priority media item; and based on replacing the first priority media item with the second priority media item, reset the indication of the first request to play back the scheduled playlist of media items.

6. The cloud-based computing system of claim 1, wherein:

the program instructions that are executable by the at least one processor such that the cloud-based computing system is configured to maintain the priority media item comprise program instructions that are executable by the at least one processor such that the cloud-based computing system is configured to maintain the priority media item for the given period of time; and the program instructions that are executable by the at least one processor such that the cloud-based computing system is configured to receive, from the playback device associated with the user account, the request comprise program instructions that are executable by the at least one processor such that the cloud-based computing system is configured to receive, from the playback device associated with the user account, the request during the given period of time.

7. The cloud-based computing system of claim 1, wherein the request to play back the scheduled playlist of media items comprises a first request, the cloud-based computing system further comprising program instructions stored on the at least one non-transitory computer-readable medium that are executable by the at least one processor such that the cloud-based computing system is configured to:
  after transmitting the priority media item to the playback device associated with the user account, maintain an indication of a local playback position within the priority media item for the playback device associated with the user account;
  after receiving the first request, receive a second request from the playback device associated with the user account to discontinue playback of the priority media item;
  at a given time that follows receiving the first request by less than a playback duration of the priority media item, receive, from the playback device associated with the user account, a third request to resume playback of the scheduled playlist of media items; and
  based on the third request to resume playback, transmit the priority media item to the playback device associated with the user account for playback beginning at the local playback position within the priority media item that corresponds to the given time.

8. The cloud-based computing system of claim 1, wherein the priority media item comprises two or more media items.

9. A non-transitory computer-readable medium, wherein the non-transitory computer-readable medium is provisioned with program instructions that, when executed by at least one processor, cause a cloud-based computing system to:
  maintain (i) a scheduled playlist of media items for playback by one or more playback devices, (ii) a current playback position within the scheduled playlist of media items, and (iii) a priority media item for playback by the one or more playback devices;
  while the current playback position within the scheduled playlist of media items is advancing, receive, from a playback device associated with a user account, a request to play back the scheduled playlist of media items;
  determine that the user account has not been associated with any playback device that previously played back the priority media item within a given period of time; and
  based on determining that the user account has not been associated with any playback device that previously played back the priority media item within the given period of time, transmit the priority media item to the playback device associated with the user account for playback beginning before playback of any media item from the scheduled playlist of media items by the playback device associated with the user account.

10. The non-transitory computer-readable medium of claim 9, wherein:
  the playback device associated with the user account is a first playback device associated with a first user account;
  the request to play back the scheduled playlist of media items is a first request to play back the scheduled playlist of media items; and
  the non-transitory computer-readable medium is also provisioned with program instructions that, when executed by at least one processor, cause the cloud-based computing system to:
    after transmitting the priority media item to the first playback device associated with the first user account, receive, from a second playback device associated with a second user account, a second request to play back the scheduled playlist of media items;
    determine that the priority media item should not be transmitted to the second playback device associated with the second user account; and
    after determining that the priority media item should not be transmitted to the second playback device associated with the second user account, transmit one or more media items from the scheduled playlist of media items, without transmitting the priority media item, to the second playback device associated with the second user for playback based on the current playback position within the scheduled playlist of media items.

11. The non-transitory computer-readable medium of claim 10, wherein:
  the non-transitory computer-readable medium is also provisioned with program instructions that, when executed by at least one processor, cause the cloud-based computing system to determine that the second playback device associated with the second user account played back the priority media item for more than a threshold period of time; and
  the program instructions that, when executed by at least one processor, cause the cloud-based computing system to transmit the one or more media items from the scheduled playlist of media items, without transmitting the priority media item, to the second playback device associated with the second user account for playback comprise program instructions that, when executed by at least one processor, cause the cloud-based computing system to transmit the one or more media items from the scheduled playlist of media items, without transmitting the priority media item, to the second playback device associated with the second user account for playback further based on the determination that second playback device associated with the second user account played back the priority media item for more than the threshold period of time.

12. The non-transitory computer-readable medium of claim 10, wherein: the non-transitory computer-readable medium is also provisioned with program instructions that, when executed by at least one processor, cause the cloud-based computing system to store an indication of the first request to play back the scheduled playlist of media items; and the program instructions that, when executed by at least one processor, cause the cloud-based computing system to transmit the one or more media items from the scheduled playlist of media items, without transmitting the priority media item, to the second playback device associated with the second user account for playback comprise program instructions that, when executed by at least one processor, cause the cloud-based computing system to transmit the one or more media items from the scheduled playlist of media items, without transmitting the priority media item, to the second playback device associated with the second user account for playback further based on the stored indication of the first request.

13. The non-transitory computer-readable medium of claim 12, wherein the priority media item is a first priority media item, and wherein the non-transitory computer-readable medium is also provisioned with program instructions that, when executed by at least one processor, cause the cloud-based computing system to:

replace the first priority media item with a second priority media item; and based on replacing the first priority media item with the second priority media item, reset the indication of the first request to play back the scheduled playlist of media items.

14. The non-transitory computer-readable medium of claim 9, wherein:

the program instructions that, when executed by at least one processor, cause the cloud-based computing system to maintain the priority media item comprise program instructions that, when executed by at least one processor, cause the cloud-based computing system to maintain the priority media item for the given period of time; and the program instructions that, when executed by at least one processor, cause the cloud-based computing system to receive, from the playback device associated with the user account, the request comprise program instructions that, when executed by at least one processor, cause the cloud-based computing system to receive, from the playback device associated with the user account, the request during the given period of time.

15. The non-transitory computer-readable medium of claim 9, wherein the request to play back the scheduled playlist of media items comprises a first request, and wherein the non-transitory computer-readable medium is also provisioned with program instructions that, when executed by at least one processor, cause the cloud-based computing system to:

after transmitting the priority media item to the playback device associated with the user account, maintain an indication of a local playback position within the priority media item for the playback device associated with the user account;

after receiving the first request, receive a second request from the playback device associated with the user account to discontinue playback of the priority media item;

at a given time that follows receiving the first request by less than a playback duration of the priority media item, receive, from the playback device associated with the user account, a third request to resume playback of the scheduled playlist of media items; and based on the third request to resume playback, transmit the priority media item to the playback device associated with the user account for playback beginning at the local playback position within the priority media item that corresponds to the given time.

16. The non-transitory computer-readable medium of claim 9, wherein the priority media item comprises two or more media items.

17. A method implemented by a cloud-based computing system, the method comprising:

maintaining (i) a scheduled playlist of media items for playback by one or more playback devices, (ii) a current playback position within the scheduled playlist of media items, and (iii) a priority media item for playback by the one or more playback devices;

while the current playback position within the scheduled playlist of media items is advancing, receiving, from a playback device associated with a user account, a request to play back the scheduled playlist of media items;

determining that the user account has not been associated with any playback device that previously played back the priority media item within a given period of time; and based on determining that the user account has not been associated with any playback device that previously played back the priority media item within the given period of time, transmitting the priority media item to the playback device associated with the user account for playback beginning before playback of any media item from the scheduled playlist of media items by the playback device associated with the user account.

18. The method of claim 17, wherein:

the playback device associated with the user account is a first playback device associated with a first user account;

the request to play back the scheduled playlist of media items is a first request to play back the scheduled playlist of media items; and the method further comprises:

after transmitting the priority media item to the first playback device associated with the first user account, receiving, from a second playback device associated with a second user account, a second request to play back the scheduled playlist of media items;

determining that the priority media item should not be transmitted to the second playback device associated with the second user account; and after determining that the priority media item should not be transmitted to the second playback device associated with the second user account, transmitting one or more media items from the scheduled playlist of media items, without transmitting the priority media item, to the second playback device associated with the second user for playback based on the current playback position within the scheduled playlist of media items.

\* \* \* \* \*